United States Patent
Blank et al.

(10) Patent No.: US 11,615,474 B2
(45) Date of Patent: *Mar. 28, 2023

(54) SYSTEM AND METHOD FOR OPTIMIZING DATA PROCESSING IN CLOUD-BASED, MACHINE LEARNING ENVIRONMENTS THROUGH THE USE OF SELF ORGANIZING MAP

(71) Applicant: THE BANK OF NEW YORK MELLON, New York, NY (US)

(72) Inventors: Brian Blank, Manalapan, NJ (US); Song He, Warren, NJ (US); Madhusudan Rana, Casselberry, FL (US); Pavithran Rajendran, Tamil Nadu (IN); Bryan Chan, East Meadow, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/319,806

(22) Filed: May 13, 2021

(65) Prior Publication Data
US 2021/0264522 A1 Aug. 26, 2021

Related U.S. Application Data

(63) Continuation of application No. 16/901,887, filed on Jun. 15, 2020, now Pat. No. 11,074,653, which is a
(Continued)

(51) Int. Cl.
*G06Q 40/00* (2012.01)
*G06Q 40/06* (2012.01)

(52) U.S. Cl.
CPC .................................. *G06Q 40/06* (2013.01)

(58) Field of Classification Search
USPC ...... 705/35, 39, 37, 38, 36, 40, 26; 719/328, 719/315; 717/108; 709/226, 227;
(Continued)

(56) References Cited

U.S. PATENT DOCUMENTS

| 7,428,506 | B2 * | 9/2008 | Waelbroeck | G06Q 40/025 |
| | | | | 705/37 |
| 2003/0033240 | A1 * | 2/2003 | Balson | G06Q 40/06 |
| | | | | 705/37 |

(Continued)

OTHER PUBLICATIONS

A Variable Payout Information Security Financial Instrument and Trading Mechanism to Address Information Security Risk; 2015 10th International Conference on P2P, Parallel, Grid, Cloud and Internet Computing (3PGCIC) (pp. 17-25); Pankaj Pandey Steven De Haes; Nov. 4, 2015. (Year: 2015).*

(Continued)

*Primary Examiner* — Tien C Nguyen
(74) *Attorney, Agent, or Firm* — Pillsbury Winthrop Shaw Pittman, LLP

(57) ABSTRACT

Methods and system are described for optimizing data processing in cloud-based, machine learning environments. For example, through the use of a machine learning model utilizing a self organizing map and/or the use of specific processing nodes in a computer system to perform specific tasks the methods and system may more efficiently distribute tasks through a cloud computing environment and increase overall processing speeds despite increasing amounts of data. The methods and system described herein are particularly related to collateral allocation computer systems that automate the management of numerous collateral assets. For example, as the amount of collateral assets and the complexity of given transactions grow, typical allocation sys-
(Continued)

tems face frequent processing delays related to collateral allocations (e.g., allocations of collateral associated with Tri-Party Repos).

20 Claims, 13 Drawing Sheets

Related U.S. Application Data continuation-in-part of application No. 14/214,047, filed on Mar. 14, 2014, now abandoned, which is a continuation of application No. 13/362,980, filed on Jan. 31, 2012, now Pat. No. 8,762,246, said application No. 16/901,887 is a continuation-in-part of application No. 16/546,953, filed on Aug. 21, 2019, now Pat. No. 10,991,040, which is a continuation of application No. 14/137,441, filed on Dec. 20, 2013, now abandoned.

(60) Provisional application No. 61/438,195, filed on Jan. 31, 2011, provisional application No. 61/745,187, filed on Dec. 21, 2012.

(58) Field of Classification Search
USPC ........... 715/704, 753; 235/375, 380; 463/25; 340/540
See application file for complete search history.

(56) References Cited

U.S. PATENT DOCUMENTS

| | | | | |
|---|---|---|---|---|
| 2005/0108153 | A1* | 5/2005 | Thomas | G06Q 20/14 705/39 |
| 2007/0233594 | A1* | 10/2007 | Nafeh | G06Q 40/00 705/37 |
| 2009/0299895 | A1 | 12/2009 | Fitzpatrick | |
| 2009/0306881 | A1 | 12/2009 | Dolgov et al. | |
| 2010/0030705 | A1* | 2/2010 | Tharmananthar | G06Q 40/04 705/37 |
| 2011/0231307 | A1 | 9/2011 | Caffrey | |
| 2012/0150715 | A1* | 6/2012 | Boudreault | G06Q 40/06 705/37 |
| 2012/0259796 | A1 | 10/2012 | Blank | |
| 2013/0179330 | A1 | 7/2013 | Quillian | |
| 2020/0394723 | A1 | 12/2020 | Baker | |

OTHER PUBLICATIONS

Art Market Investment Security Modelling and Blockchain Technologies Perspectives; 2019 IEEE International Scientific-Practical Conference Problems of Infocommunications, Science and Technology (PIC S&T) (pp. 273-277); Tetiana Momot, Nataliia Chekh, Daryna Momot; Oct. 8, 2019. (Year: 2019).*

H.M. Ennis et al., Strategic Behavior in the Tri-Party Repo Market. Economic Quarterly (U.S. Pat. No. 10,697,225), 97(4), pp. 389-413.

B. Begalle et al. The risk of Fire Sales in the Tri-Party Repo Market, 2016 Contemporary Economic Policy, 34(3), pp. 513-530. https://doi.org.10.1111/coep.12126.

A.F. Silva, Strategic Liquidity Mismatch and Financial Sector Stability. Review of Financial Studies, (2019), 32(12), pp. 4696-4733. https://doi.org/10.1093/rfs/hhz044.

Grid Resource Allocation by Means of Option Contracts, IEEE Systems Journal (vol. 3, Issue 1, pp. 49-64), A. Bossenbroek, A. Tirado-Ramos, P.M.A. Sloot, Feb. 6, 2009.

Preparing a Negotiated R&D Portfolio with a Prediction Market; Proceedings of the 41$^{st}$ Annual Hawaii International Conference on System Sciences (HICSS 2008) (p. 53), C. Gaspoz, Y. Pigneur, Jan. 1, 2008.

International Search Report and Written Opinion of the International Searching Authority issued for International Application No. PCT/US2013/077241 dated Apr. 21, 2014.

International Preliminary Report on Patentability issued in International Patent Application No. PCT/US2013/077241 dated Jul. 2, 2015.

* cited by examiner

FIG. 3

BEFORE MAXIMAL ALLOCATION

| Iter 0 | SA | DB | AS | Collateralized | Dealer Box (DB) | Allocated Securities (AS) |
|---|---|---|---|---|---|---|
| R1 | 0 | 13 | 0 | N | S1 S2 S3 S4 S5<br>S6 S7 S8 S9 S10<br>S11 S12 S13 S14 S15<br>S16 S17 S18 S19 S20<br>S21 S22 S23 S24 S25 | |
| R2 | 0 | 16 | 0 | N | | |
| R3 | 0 | 15 | 0 | N | | |
| R4 | 0 | 12 | 0 | N | | |
| R5 | 0 | 14 | 0 | N | | |
| R6 | 0 | 6 | 0 | N | | |
| R7 | 0 | 5 | 0 | N | | |
| R8 | 0 | 10 | 0 | N | | |

AFTER MAXIMAL ALLOCATION EXECUTION

| Iter 1 | SA | DB | AS | Collateralized | Dealer Box (DB) | Allocated Securities (AS) |
|---|---|---|---|---|---|---|
| R7 | S1 S3 | 2 | 1 | 2 | Y | S7 S4 S15<br>S12 S18 S9 | S1 S2 S3 S4 S5<br>S6 S8 S13 S14 S10<br>S11 S17 S19 S24 S20<br>S22 S23 S25 |
| R6 | S2 S5 S6 S8 | 4 | 0 | 2 | N | | |
| R8 | S10 S11 S13 | 3 | 0 | 7 | N | | |
| R4 | S14 S17 S19 | 3 | 3 | 7 | Y | | |
| R1 | S19 S20 | 2 | 4 | 7 | Y | | |
| R5 | S20 S22 S23 | 3 | 5 | 6 | Y | | |
| R3 | S24 S25 | 2 | 5 | 8 | Y | | |
| R2 | S25 | 1 | 0 | 15 | N | | |

AFTER REPLACEMENT ALGORITHM EXECUTION

| Iter 2 | SA | DB | AS | Collateralized | Dealer Box (DB) | Allocated Securities (AS) |
|---|---|---|---|---|---|---|
| R6 | S2 S5 S6 S8 S19 | 5 | 0 | 1 | Y | S18 | S1 S2 S3 S4 S5<br>S6 S7 S8 S9 S10<br>S11 S12 S13 S14 S15<br>S16 S17 S19 S24 S20<br>S22 S23 S25 |
| R8 | S10 S11 S13 S14 S24 | 3 | 0 | 7 | Y | | |
| R2 | S25 S25 S23 | 1 | 0 | 15 | Y | | |
| R7 | S1 S3 | 2 | 1 | 2 | Y | | |
| R4 | S14 S17 | 3 | 3 | 7 | Y | | |
| R1 | S20 S12 S15 | 1 | 4 | 7 | Y | | |
| R5 | S20 S22 S4 S9 S16 | 3 | 5 | 6 | Y | | |
| R3 | S7 | 2 | 5 | 8 | Y | | |

SA - NUMBER OF SECURITIES ALLOCATED TO A REPO ACCOUNT IN A PARTICULAR ITERATION
DB - ELIGIBLE SECURITIES IN THE DEALER BOX
AS - ELIGIBLE SECURITIES IN THE ALLOCATED SECURITIES BOX

FIG. 4

| BNY Mellon – Broker Dealer Services – GCM – Customers | | | □|□|× |
|---|---|---|---|
| Modify V3 CPO Allocation Template | | | |

| Template Name XXXX XXX XXXX —B | Close This Window | Cancel —J | Confirm —K |

A ↙

Pre - Optimization Phase
   MINMOD  YES       Minimum Modifications made to Accounts associated with MINMOD tag.

Optimization Phase
   FFSFAC  NO       Forced Fussy Factor controls how strictly the previous option (FUSFAS) should be enforced.
   FULREP  NO       Full Replacement controls the number of passes that would run in Full Replacement Algorithm.
   FUSFAC  25       Fussy Factor controls the percentage of a position that get's allocated in each iteration.
   IMNMOD  NO       Include Minimum Modification (MINMOD) flagged accounts in Replacement Algorithm.
   MXNOPOS  YES  —I   The Maximum Number of Positions that can be used for allocation.
   REPSRT  NONE   Should the Replacement algorithm run the Deals with older start date option (ISHPRI) or the Deals with a lower priority option (SHPRIO).
   RETRY  2       Number of times to Retry Optimization & Post-Optimization Phases.

Post - Optimization Phase
Section 1
   BASKET  1       Accounts assigned to Basket Tag should be allocated before accounts that are not assigned to Basket Tag.
   ISHPRI  2       Deals with older start dates, still under collateralized, should be allocated before accounts that have earlier start dates.
   MARDED  0       Accounts with closed Markets should be allocated before accounts with open markets.
   SHRPIO  3       Deals with lower priority, still under collateralized, should be allocated before accounts with higher priority.

Section 2
   BTMRGM  0       Priority assigned to the use of Better Margins compared to the Cost of Carry.
   COSCAR  4       Priority assigned to the use of the Cost of Carry Profile compared to the Better Margin option.

Instruction Allocation Server
   DLRID  XXXX    Parent Dealer ID
   SUBMIT  ALWAYS  When should the CPO changes be submitted

THE BANK OF NEW YORK MELLON

☐ show Positions menu
Show Allocation History

☐ Printer Friendly | ☐ Refresh
Goto page bottom

| AllocID | Allocate To | Source | Mode | Type | Status | Open ID | Event Date Time | Number of Deals | Deals Done |
|---------|-------------|--------|------|------|--------|---------|-----------------|-----------------|------------|
| 60023 | XXX | XXX | T | CPO Allocation | IN PROGRESS | XXX | 03/12/2010 16:32:47 | 312 | 0 |
| 59887 | XXX | XXX | T | CPO Allocation | DONE | XXX | 03/12/2010 12:42:39 | 1 | 1 |
| 59820 | XXX | XXX | T | CPO Allocation | DONE | XXX | 03/12/2010 11:55:19 | 14 | 14 |
| 59755 | XXX | XXX | T | CPO Allocation | DONE | XXX | 03/12/2010 11:09:29 | 312 | 301 |
| 59751 | XXX | XXX | T | CPO Allocation | ABORT | XXX | 03/12/2010 11:09:07 | 312 | 0 |
| 59748 | XXX | XXX | T | CPO Allocation | ABORT | XXX | 03/12/2010 11:07:58 | 312 | 5 |
| 59697 | XXX | XXX | T | CPO Allocation | DONE | XXX | 03/12/2010 10:31:29 | 5 | 5 |
| 59678 | XXX | XXX | T | CPO Allocation | DONE | XXX | 03/12/2010 10:21:11 | 5 | 5 |
| 59656 | XXX | XXX | T | CPO Allocation | DONE | XXX | 03/12/2010 10:15:03 | 16 | 16 |
| 59647 | XXX | XXX | T | CPO Allocation | DONE | XXX | 03/12/2010 10:14:09 | 5 | 5 |
| 59565 | XXX | XXX | T | CPO Allocation | DONE | XXX | 03/12/2010 09:29:19 | 311 | 300 |
| 59476 | XXX | XXX | T | CPO Allocation | DONE | XXX | 03/12/2010 08:37:10 | 19 | 19 |
| 59424 | XXX | XXX | T | CPO Allocation | DONE | XXX | 03/12/2010 07:54:21 | 1 | 1 |
| 59343 | XXX | XXX | T | CPO Allocation | DONE | XXX | 03/12/2010 07:02:13 | 3 | 3 |
| 59296 | XXX | XXX | T | CPO Allocation | DONE | XXX | 03/12/2010 06:06:24 | 321 | 310 |
| 59216 | XXX | XXX | T | CPO Allocation | DONE | XXX | 03/12/2010 04:38:08 | 16 | 16 |
| 59153 | XXX | XXX | T | CPO Allocation | DONE | XXX | 03/12/2010 03:54:28 | 3 | 3 |

Back to top

FIG. 9

SYSTEM AND METHOD FOR OPTIMIZING DATA PROCESSING IN CLOUD-BASED, MACHINE LEARNING ENVIRONMENTS THROUGH THE USE OF SELF ORGANIZING MAP

The present application is a continuation of U.S. application Ser. No. 16/901,887, filed Jun. 15, 2020, which is a continuation-in-part of U.S. application Ser. No. 14/214,047, filed Mar. 14, 2014, and Ser. No. 16/546,953, filed Aug. 21, 2019. U.S. application Ser. No. 16/546,953, is a continuation of U.S. patent application Ser. No. 14/137,441, filed Dec. 20, 2013, which claims the benefit of U.S. Provisional Application No. 61/745,187, filed Dec. 21, 2012. U.S. Provisional Application No. 61/745,187 is related to U.S. patent application Ser. No. 13/362,980, filed Jan. 31, 2012, which claims benefit to U.S. Provisional Application No. 61/438,195, filed Jan. 31, 2011. U.S. Provisional Application No. 61/745,187 is also related to U.S. Provisional Patent Application No. 61/647,346, filed May 15, 2012. U.S. application Ser. No. 14/214,047, is a continuation of U.S. application Ser. No. 13/362,980, filed Jan. 31, 2012, now U.S. Pat. No. 8,762,246, which in turn claims the benefit of priority of U.S. Provisional Application No. 61/438,195, filed Jan. 31, 2011. Each of the above-mentioned applications are incorporated herein in their entireties by reference.

BACKGROUND

In recent years, the amount of data available and types of data has exponentially increased. Furthermore, the amount of data that is required in order to perform different functions has also exponentially increased. Even the advances in data processing speeds have met limitations in processing the exponentially increasing amounts of data. This is particular true in applications that require real-time or near real-time allocations, and results based on real-time or near real-time allocations of data, in complex systems.

SUMMARY

In view of these problems, methods and system are described for optimizing data processing in cloud-based, machine learning environments. For example, through the use of a machine learning model utilizing a self organizing map and/or the use of specific processing nodes in a computer system to perform specific tasks the methods and system may more efficiently distribute tasks through a cloud computing environment and increase overall processing speeds despite increasing amounts of data. The methods and system described herein are particularly related to collateral allocation computer systems that automate the management of numerous collateral assets. For example, as the amount of collateral assets and the complexity of given transactions grow, typical allocation systems face frequent processing delays related to collateral allocations (e.g., allocations of collateral associated with Tri-Party Repos). Moreover, these computer systems often operate in environments where the data needed to be processed is stored through a cloud computing environment, often controlled by different entities.

For example, the methods and system may use a machine learning model that is trained using unsupervised learning to produce a representation of the training data in a cloud computing environment. The trained model may then be used to generate recommendations based on test data that is also collected in the cloud computing environment (e.g., and from numerous entities in the cloud computing environment). Furthermore, due to the amount of collateral assets and the complexity involved, the machine learning model may generate a low-dimensional (e.g., two-dimensional) representation based on discrete quantities of data. The methods and system may achieve this through the use of a self organizing map, which differs from other artificial neural networks through its use of competitive learning (e.g., learning in which nodes compete for the right to respond to a subset of the input data) as opposed to error-correction learning. That is, the individual nodes of the network learn to specialize on ensembles of similar patterns and in so doing become feature detectors for different classes of input patterns. Furthermore the methods and system may train a machine learning model to generate the self organizing map based on portfolio deal attributes including collateral allocation rulesets associated with a training portfolio. The methods and systems may then use the trained machine learning model for deal attributes including collateral allocation rulesets associated with a given device. By using the trained machine learning model to process only the deal attributes associated with a given device, the methods and systems improve response time as the nodes of the network are trained to specialize on ensembles of similar patterns and are only required to access data from a given device in the cloud network.

Aspects of the invention relate to methods, apparatuses, and/or systems for providing efficient collateral allocations, including, for example, facilitating transaction-subset-assignment of computer processing nodes to perform such collateral allocations.

Various other aspects, features, and advantages of the invention will be apparent through the detailed description of the invention and the drawings attached hereto. It is also to be understood that both the foregoing general description and the following detailed description are exemplary and not restrictive of the scope of the invention.

BRIEF DISCUSSION OF THE DRAWINGS

FIG. 1 provides a functional block diagram of an embodiment of a computer-implemented and networked system for collateral management;

FIG. 3 illustrates an example of reallocations of securities throughout the operation of the optimization algorithm;

Figure 4:
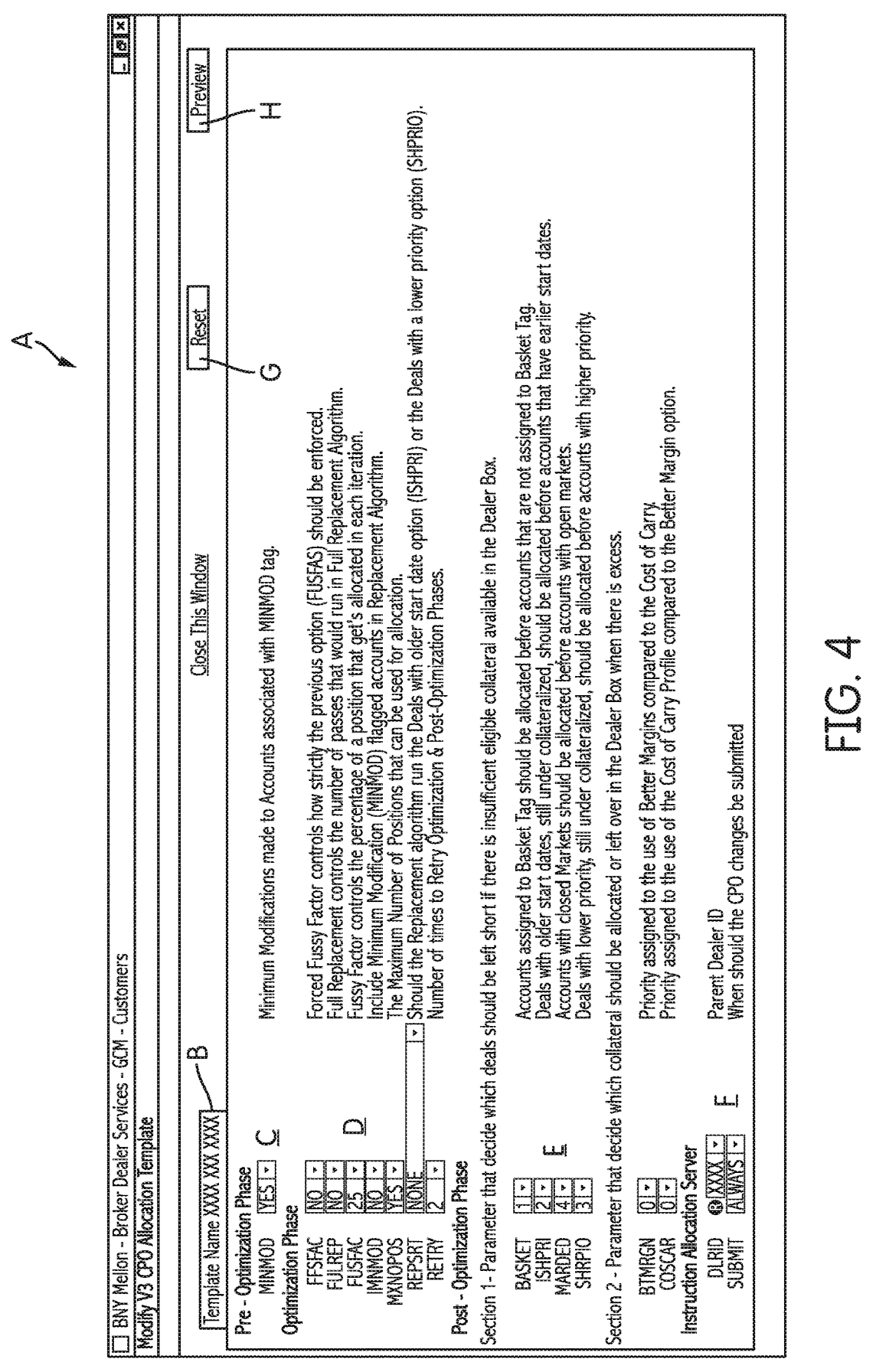
Figure 6:
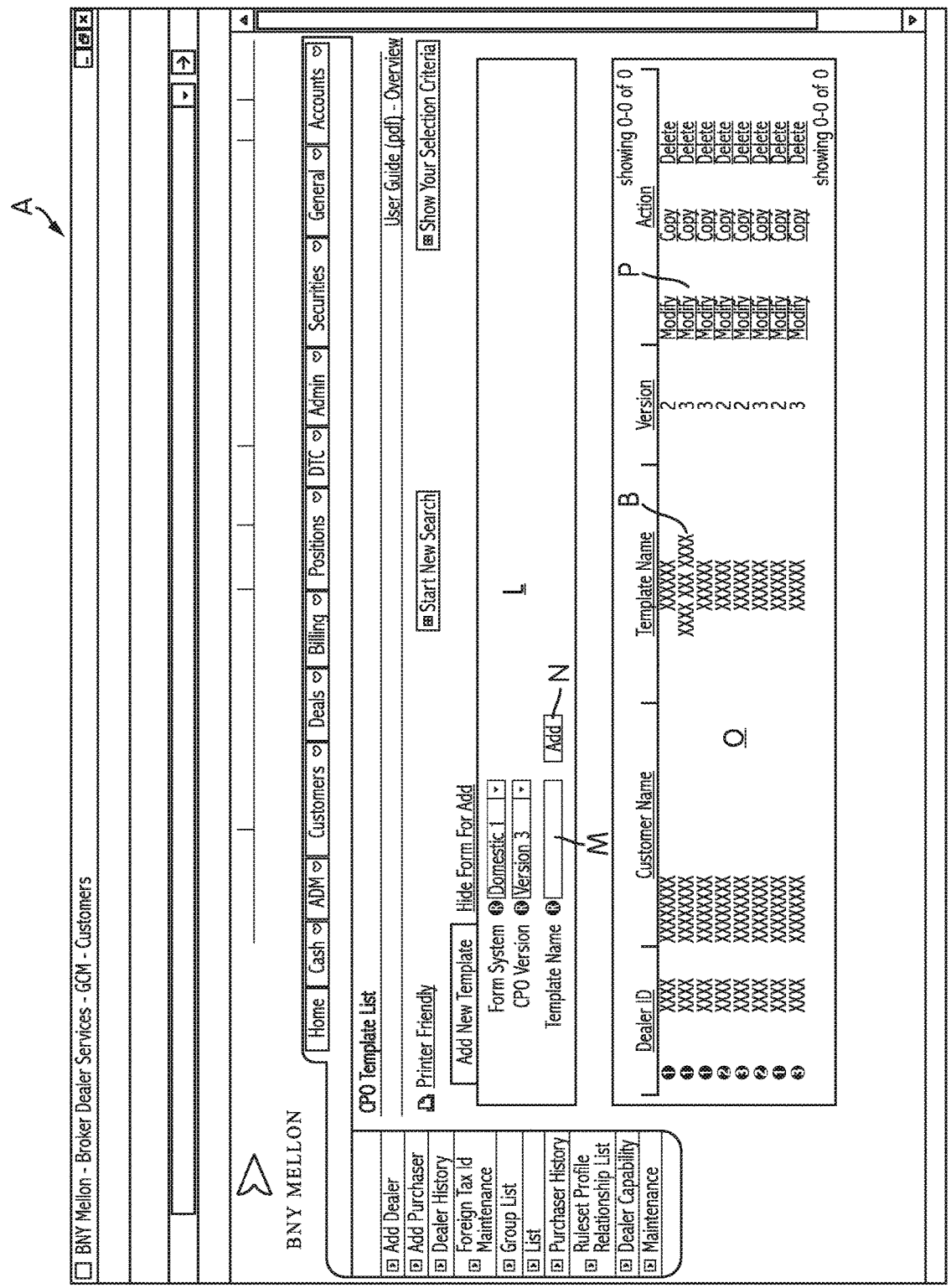
Figure 10:
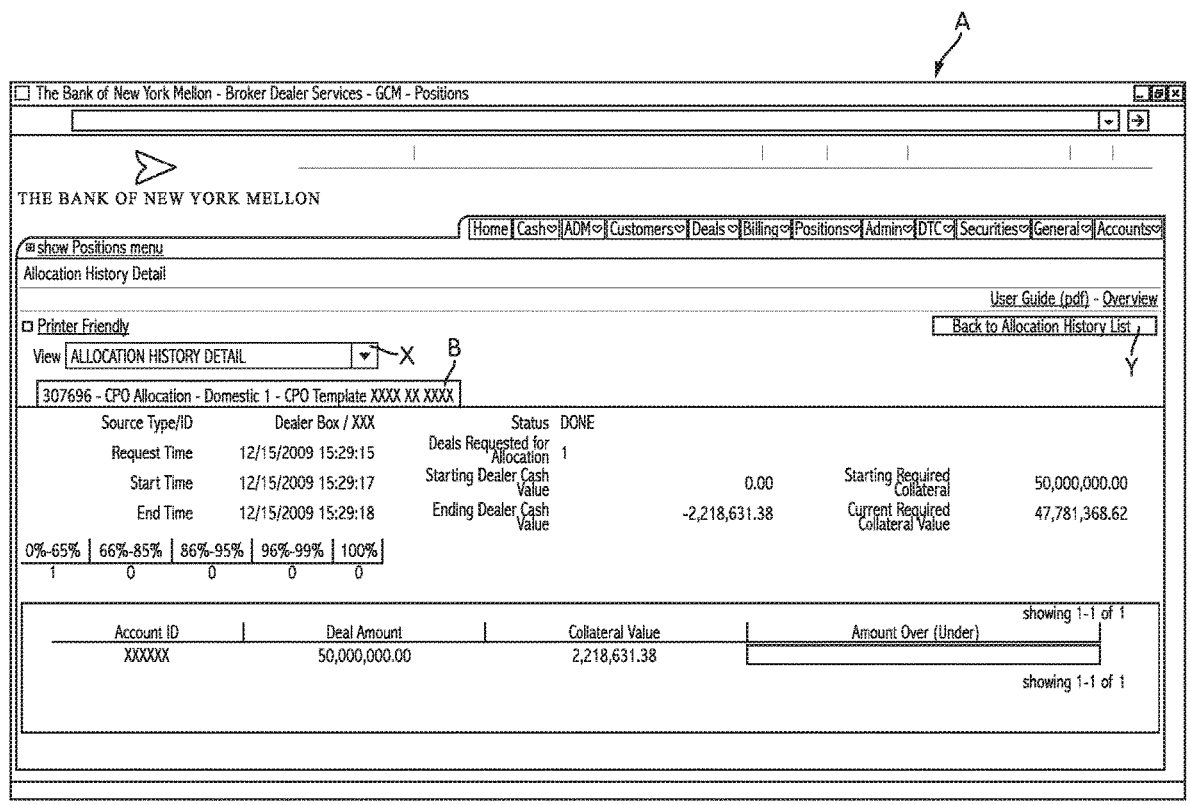
Figure 11:
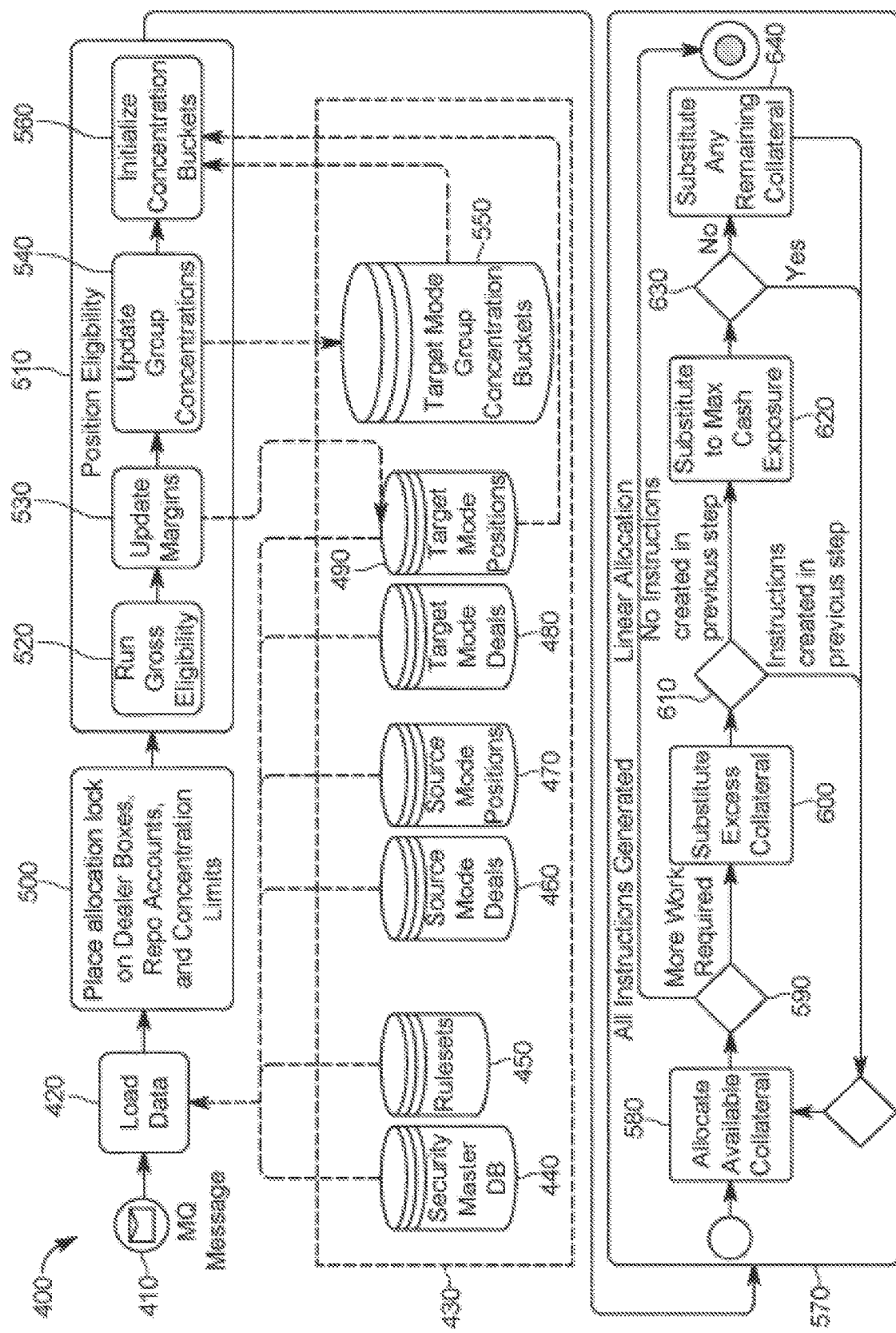
Figure 12:
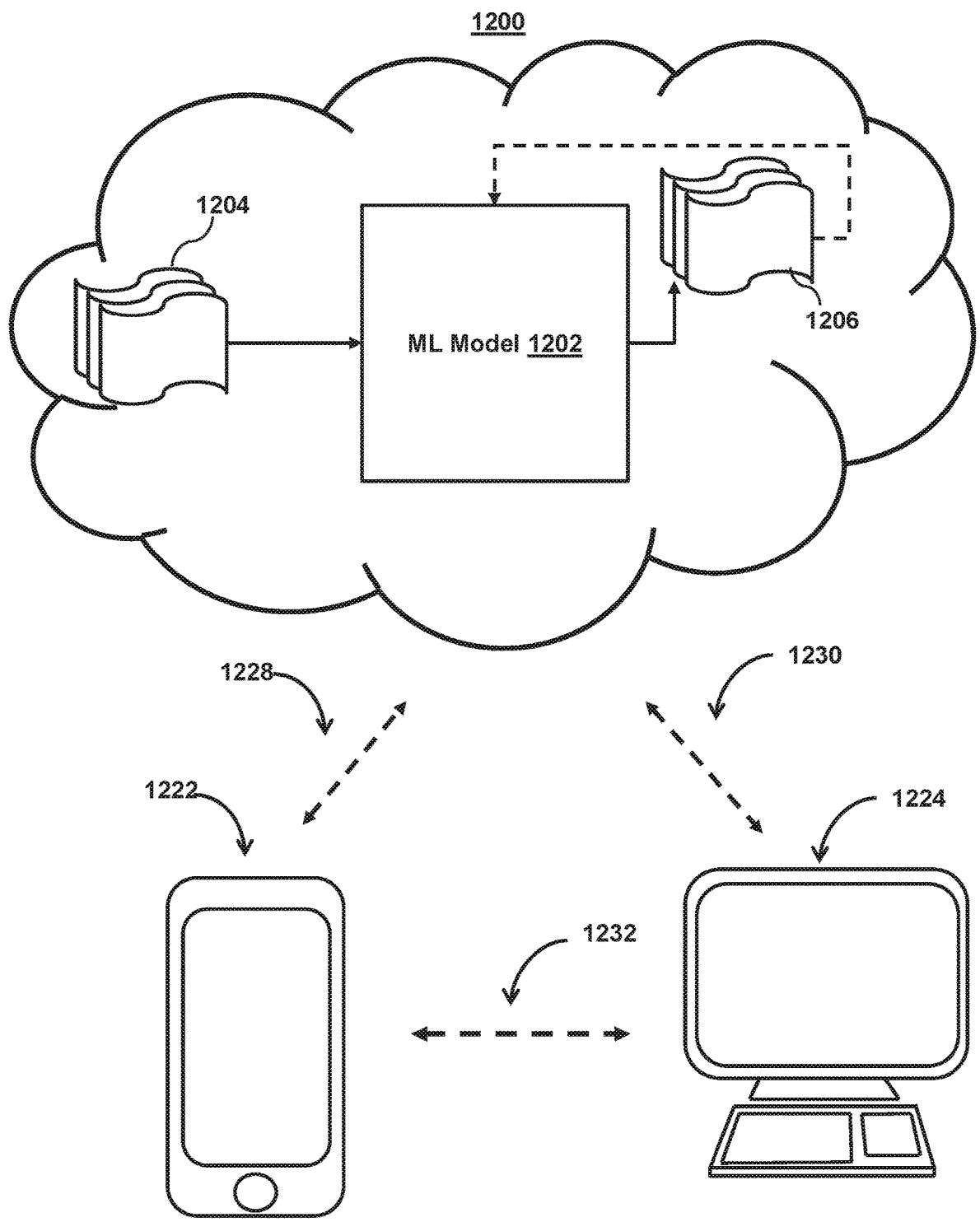

FIG. 4 provides an illustrative screen shot representing an allocation template modification screen that may be used in a graphical user interface of an embodiment of this disclosure;

FIG. 5 provides an illustrative screen shot representing an allocation template review screen that may be used in a graphical user interface of an embodiment of this disclosure;

FIG. 6 provides an illustrative screen shot representing an allocation template list screen that may be used in a graphical user interface of an embodiment of this disclosure;

Figure 7:
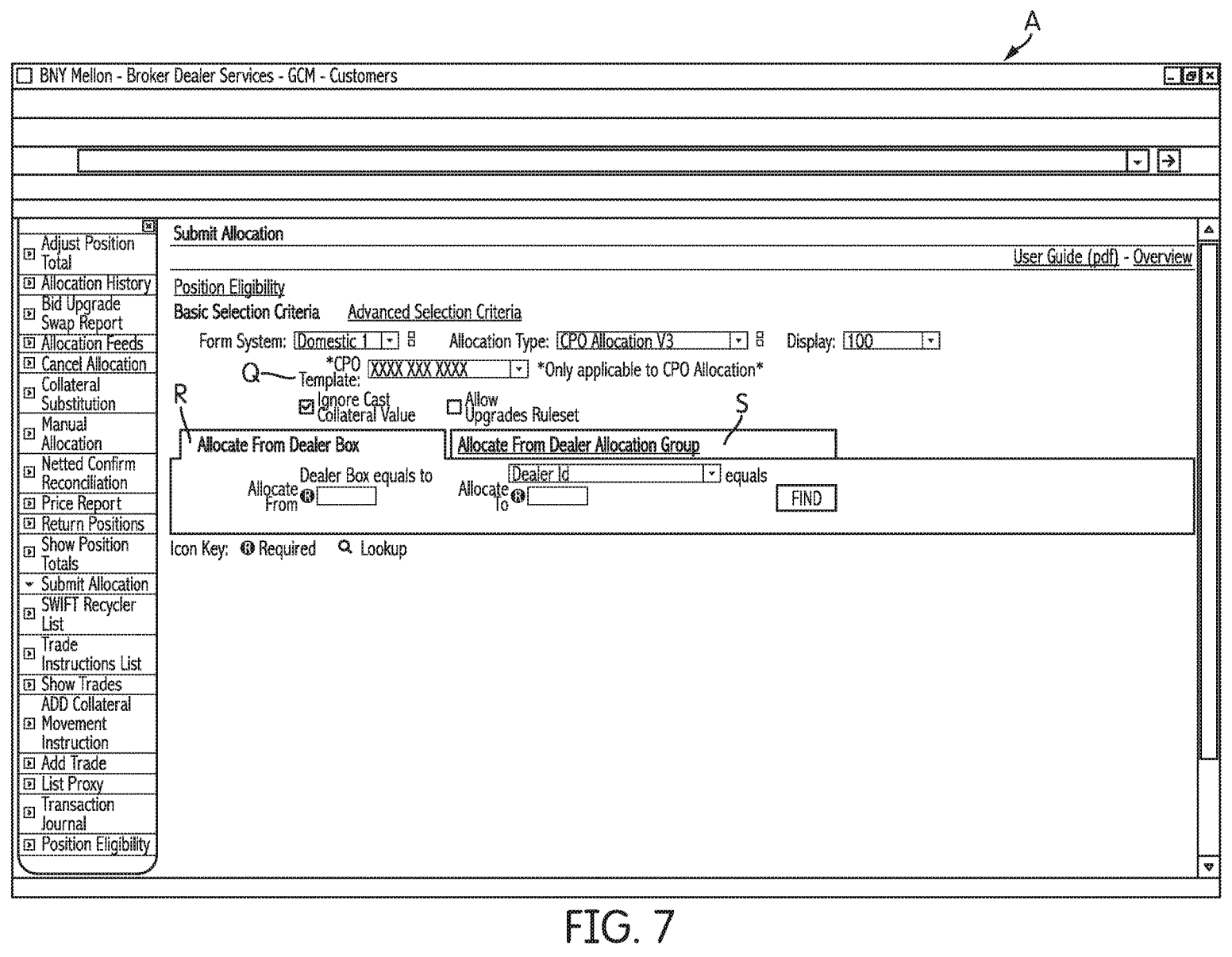

FIG. 7 provides an illustrative screen shot representing an allocation submission screen that may be used in a graphical user interface of an embodiment of this disclosure;

Figure 8:
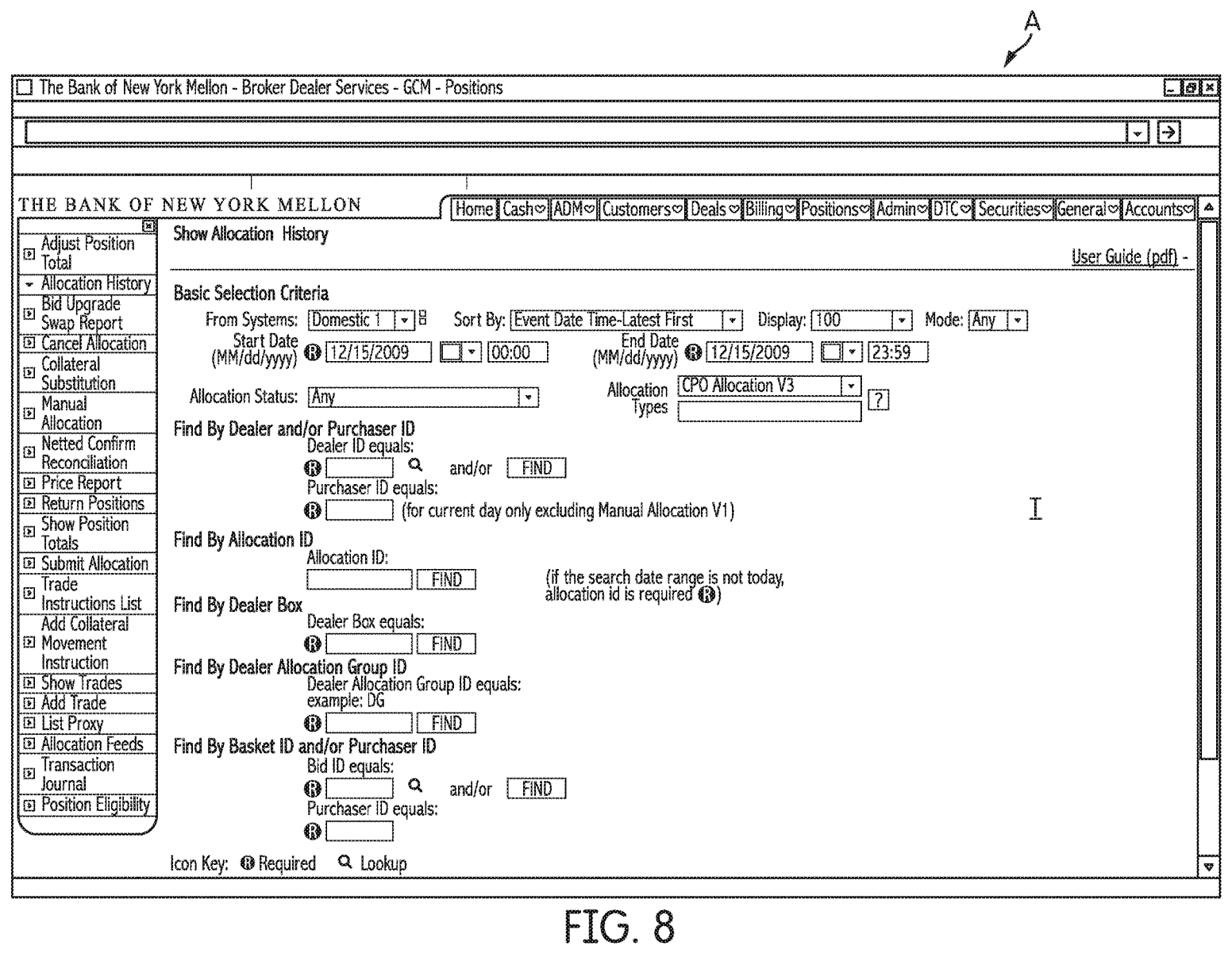

FIG. 8 provides an illustrative screen shot representing an allocation history search screen that may be used in a graphical user interface of an embodiment of this disclosure;

FIG. 9 provides an illustrative screen shot representing an allocation history search results screen that may be used in a graphical user interface of an embodiment of this disclosure;

FIG. 10 provides an illustrative screen shot representing an allocation history detail report screen that may be used in a graphical user interface of an embodiment of this disclosure;

FIG. 11 illustrates an embodiment of a workflow configured to implement optimization models described herein; and FIG. 12 illustrates a system for optimizing data processing in machine learning environments through the use of self organizing maps in some embodiments.

DETAILED DESCRIPTION

In the discussion of various embodiments and aspects of the system and method of this disclosure, examples of a processor may include any one or more of, for instance, a personal computer, portable computer, personal digital assistant (PDA), workstation, or other processor-driven device, and examples of network may include, for example, a private network, the Internet, or other known network types, including both wired and wireless networks.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

In a Repurchase Agreement ("Repo"), a seller (dealer/borrower/cash receiver) sells securities for cash to a buyer (lender/cash provider) and agrees to repurchase those securities at a later date for more cash. The Repo rate is the difference between borrowed and paid back cash expressed as a percentage. The buyer typically utilizes Repos to invest cash for an agreed upon duration of time (typically overnight, although the term may vary), and would receive a rate of interest in return for the investment. The seller typically utilizes Repos to finance long positions in securities or other assets in the seller's portfolio.

Repos are financial instruments used in money markets and capital markets, and are economically similar to a secured loan, with the buyer receiving securities as collateral to protect against default. Virtually any security may be employed in a Repo, including, for example, Treasury or Government bills, corporate and Treasury/Government bonds, stocks/shares, or other securities or financial instruments. In a Repo, however, the legal title to the securities clearly passes from the seller to the buyer, or "investor". Coupons (installment payments that are payable to the owner of the securities), which are paid while the Repo buyer owns the securities are, in fact, usually passed directly onto the Repo seller. This may seem counterintuitive, as the ownership of the collateral technically rests with the buyer during the Repo agreement. It is possible to instead pass on the coupon by altering the cash paid at the end of the agreement, though this is more typical of Sell/Buy Backs.

Although the underlying nature of a Repo transaction is that of a loan, the terminology differs from that used when talking of loans because the seller does actually repurchase the legal ownership of the securities from the buyer at the end of the agreement. Although the actual effect of the whole transaction is identical to a cash loan, in using the "repurchase" terminology, the emphasis is placed upon the current legal ownership of the collateral securities by the respective parties.

In a Tri-Party Repo, the collateral is managed by a third-party agent (a "Tri-Party agent") (typically a bank), who may match the details of the trade agreed upon by the buyer and the seller, and assume all of the post trade processing and settlement work. The Tri-Party agent controls the movement of securities, such that the buyers do not actually take delivery of collateralized securities. The Tri-Party agent acts as a custodian for the collateral, and allows the flow of collateral and cash between buyers and sellers across one or more deals.

In some Repo agreements, the seller/dealer may have numerous assets that are being managed by the Tri-Party agent. In these cases, it may be desirable for the Tri-Party agent to allow for the restructuring of the collateral of the deals, so that the seller may free up some assets while placing other agreeable assets in the legal ownership of the buyer, during the deal. Such movements would generally be agreed to by the buyer and the seller when entering the agreement to be managed by the Tri-Party agent.

In various embodiments, a web-based collateral management system or platform links dealers with investors to conduct collateral transactions in a safe, efficient, and reliable way. Online dealers and investors can manage collateral among a diverse range of instruments, including Tri-Party repo agreements in all major currencies, securities lending transactions, municipal deposits, bank loans, derivatives transactions, letters of credit, and structured trades, for example. The system may be managed by the Tri-Party agent, and may additionally provide, for example, daily mark-to-market valuations, haircuts/margins, and concentration limits (i.e., maintain percentages of market capitalization, dollar amount limits for a particular security, or a percentage of the portfolio in a particular security, for example), as well as manage, track, and settle collateral transactions across global capital markets by working collaboratively with clients to provide collateral transparency. The enhanced collateral allocation aspect of this disclosure may allow dealers (i.e., the sellers in Repos) to control and/or automatically permit the shifting of collateral associated with a plurality of deals that are under the management of the Tri-Party agent, even though the collateral is titled to the buyers in the Repo. Such transfers may "optimize" the allocations, so, for example, the fewest number of deals are under-collateralized or over-collateralized, while the collateral allocations meet buyer and/or seller requirements for the deals, as described in greater detail below.

In some embodiments, a query may be performed to obtain a set of transactions. Computer processing nodes may be selected from a set of available nodes for performing collateral allocations. Collateral allocation rules associated with a lender may be obtained, and each of the computer processing nodes may be caused to perform collateral allocations for one subset of the transaction set in accordance with the collateral allocation rules by assigning transactions of the transaction set respectively to the computer processing nodes such that the computer processing nodes collectively perform collateral allocations for the transaction set. In some embodiments, each of the computer processing nodes may be configured to transmit parameter updates to be provided to the other computer processing nodes and perform its respective collateral allocation based on the other computer processing nodes' parameter updates.

Various embodiments of this disclosure may be used in conjunction with existing financial services platforms, for example the Bank of New York Mellon's Tri-Party repurchase agreement products (RepoEdge®) which allow clients to outsource the operational aspects of their collateralized transactions, and Derivatives Margin Management (DM Edge®), which helps clients manage credit risks associated with derivatives transactions by enabling them to accept, monitor and re-transfer collateral. These services, among others such as Repo Margin Management (RM Edge®), MarginDirect$^{SM}$, and Derivatives Collateral Net (DCN), may be delivered to clients through AccessEdge$^{SM}$, a real-time, web-based portal.

The operator/manager of the system and method of this disclosure acts as a third-party service provider to the two principals to a trade, and the various functions performed by the system and method provide value-added services which mitigate risk and lead to greater efficiencies for both parties.

According to an embodiment, a system for managing collateral allocations in one or more Tri-Party repurchasing agreements includes one or more processors and one or more memory elements coupled to the one or more processors. The one or more memory elements are configured to at least store deal attributes including rulesets associated with the buyer, and one or more collateral characteristics for collateral provided by the seller that are associated with each of the Tri-Party repurchasing agreements. The system further includes at least one collateral allocation module, configured through the one or more processors to recall collateral originally associated with the one or more Tri-Party repurchasing agreements into a common dealer box. The collateral allocation module is further configured to identify under-collateralized ones of the one or more Tri-Party repurchasing agreements, and identify, using a self organizing map and one or more of the rulesets and the collateral characteristics, groups of the collateral. The collateral allocation module additionally is configured to sort said groups of collateral such that smaller average margins are given a higher priority while larger average margins are given a lower priority, and assign the groups of collateral from the common dealer box to each of the one or more Tri-Party repurchasing agreements to in order from the higher priority to the lower priority, to collateralize said Tri-Party repurchasing agreements. Furthermore, the collateral allocation module is configured to replace at least a portion of the collateral assigned to the one or more Tri-Party repurchasing agreements based on the self organizing map, to collateralize a maximal number of the one or more Tri-Party repurchasing agreements with remaining collateral in the dealer box and/or collateral assigned to the one or more Tri-Party repurchasing agreements.

According to another embodiment, a computer-implemented method for allocating collateral for one or more Tri-Party repurchasing agreements includes providing one or more processors and one or more memory elements coupled to the one or more processors, configured to at least store deal attributes including rulesets associated with the buyer, and one or more collateral characteristics for collateral provided by the seller that are associated with each of the Tri-Party repurchasing agreements. The method also includes recalling, via the one or more processors, collateral originally associated with the one or more Tri-Party repurchasing agreements into a common dealer box. The method additionally includes identifying, via the one or more processors, under-collateralized ones of the one or more Tri-Party repurchasing agreements, and identifying, using a self organizing map and one or more of the rulesets and the collateral characteristics, groups of the collateral. The method further includes sorting, via the one or more processors, said groups of collateral such that smaller average margins are given a higher priority while larger average margins are given a lower priority. Furthermore, the method includes assigning the groups of collateral from the common dealer box to each of the one or more Tri-Party repurchasing agreements to in order from the higher priority to the lower priority, to collateralize said Tri-Party repurchasing agreements. The method additionally includes replacing at least a portion of the collateral assigned to the one or more Tri-Party repurchasing agreements based on the self organizing map to collateralize a maximal number of the one or more Tri-Party repurchasing agreements with remaining collateral in the dealer box and/or collateral assigned to the one or more Tri-Party repurchasing agreements.

Figure 1:
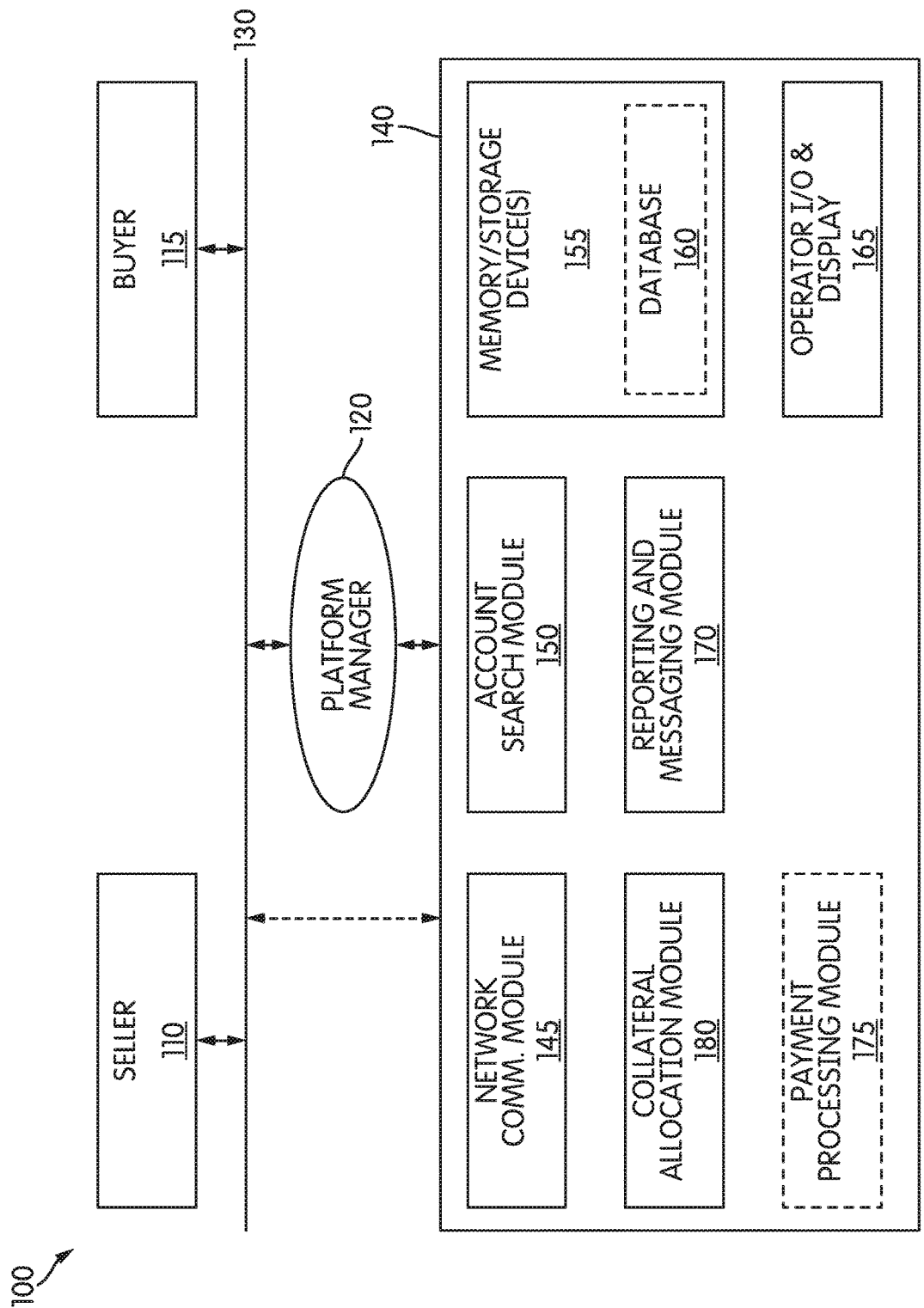

FIG. 1 illustrates a functional block diagram of an embodiment of post-trade management system 100. Post-trade management system 100 is established to permit seller 110 and buyer 115 to access collateral management system 140 via network 130 and platform manager 120, or optionally bypasses platform manager 120. Collateral management system 140 may utilize one or more processors (not shown), housed within one or more computers, which may be networked together by any appropriate mechanism, including, for example, network 130. The one or more processors are configured to run one or more modules, as described below. For example, the modules of collateral management system 140 may include network communication module 145, configured to process external communications between collateral management system 140 and network 130. Account search module 150 may be configured to search one or more databases associated with client assets held in custody for, or for the benefit of various existing clients of platform manager 120. Account search module 150 may be configured to search for a particular type of security or asset, a particular security issuer, or a security rating, for example. In some embodiments, account search module 150 may be configured to access memory storage device(s) 155, which may include one or more databases 160 therein. Memory storage device 155 may be any type of conventional storage mechanism for example, one or more hard drives, solid state drives, network storage, random access memory (RAM), combinations thereof, or so on. Database 160 may be any type of appropriate database, as would be known by a person of ordinary skill in the art, for example. Operator input/output and display module 165 represents various techniques and computer peripheral devices for providing operator input and output to collateral management system 140. In some embodiments, operator input/output and display module 165 may communicate with network communication module 145, to provide seller 110 and/or buyer 115 with remote access to collateral management system 140 via network 130.

Collateral management system 140 may additionally include reporting and messaging module 170, which may be configured to provide standard and/or custom report and messaging formats that may be transferred to network 130 by collateral management system 140, (optionally) through platform manager 120, or through an alternate communications path illustrated by the dashed double-ended arrow in FIG. 1. In some embodiments, collateral management system 140 may include payment processing module 175, indicated in dashed lines, which may have optional functionality associated with business payment activities for services rendered by the system manager (i.e., the third-party agent) in processing, evaluating, and optimizing reallocation of collateral for managed deals such as the Tri-Party Repos. As further shown in FIG. 1, and described in greater detail below, collateral management system 140 further includes collateral allocation module 180, which may be configured to us the one or more processors to evaluate various security positions that are being utilized as collateral for a Repo deal, or may be eligible to be utilized in a Repo deal, and ascertain the allocations of the security positions across a plurality of Repo deals.

Figure 2A:
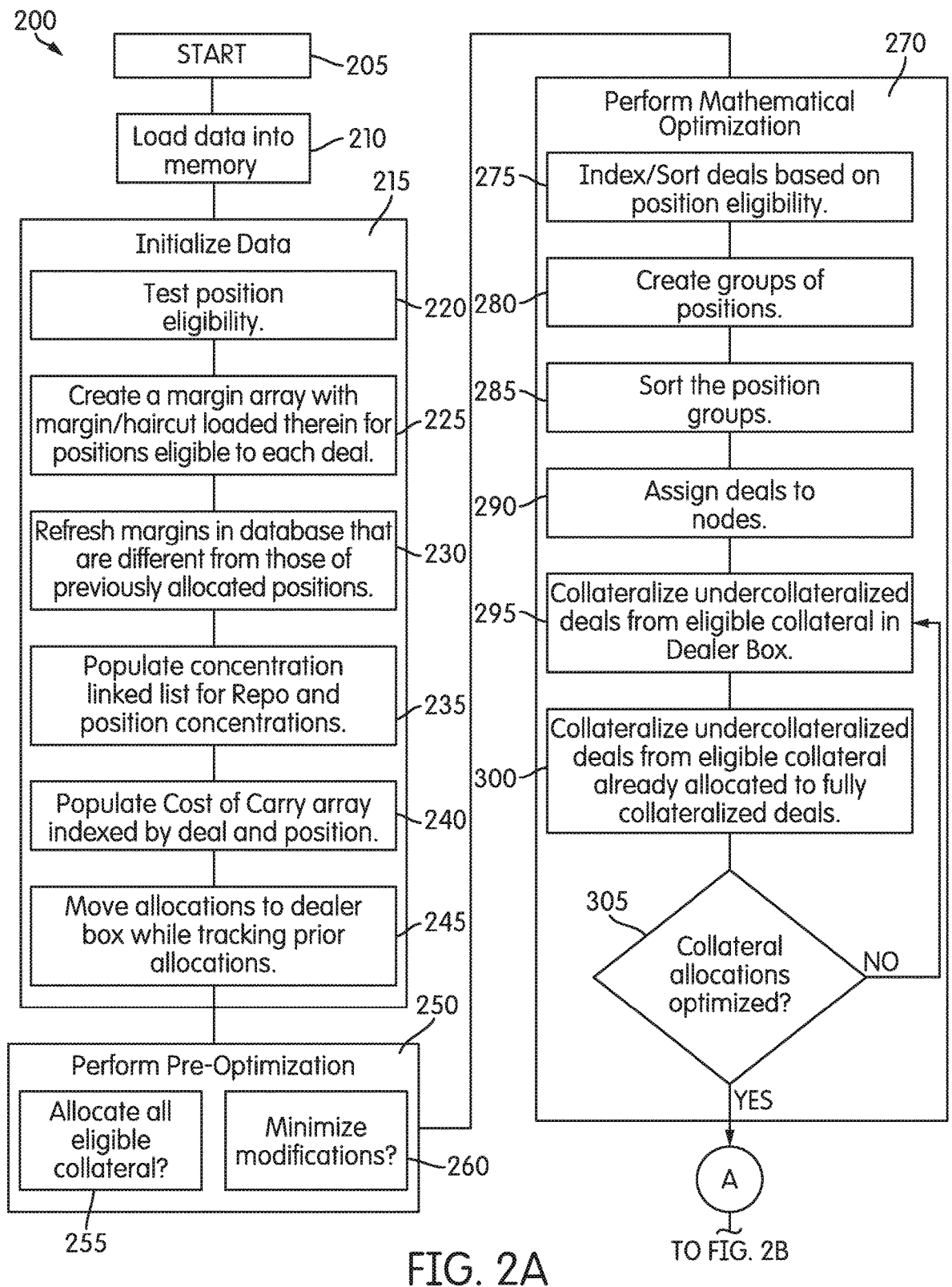
FIGS. 2A-2B illustrate a logic flowchart that implements a collateral allocation optimization algorithm and other rules relating to collateral allocation in an embodiment of this disclosure.

FIG. 2A depicts a flowchart illustrating an embodiment of a method/process of collateral allocation (process 200), which may be configured to optimize or otherwise enhance or make more efficient the allocations of collateral across a plurality of the Repo deals. In some embodiments, process 200 may be implemented by one or more algorithms which may be configured to operate in collateral allocation module 180. Although reference herein will be made to elements of post-trade management system 100 described above, in other embodiments, process 200 may be operable through another such system, or over a plurality of systems. Process 200 starts at 205, and continues to 210 where data associated with the collateral allocation is loaded into memory. In an embodiment, the data may be read from database 160. In an embodiment, the data may be copied from the database residing on a durable storage medium to a faster access storage medium (i.e., from a hard drive to random access memory). In various embodiments, the data may include one or more of Tri-Party repo deals, positions, security data, rulesets, concentration limit data, or so on. In an embodiment, application locks may be read into the memory as well, so as to prevent duplicate allocations from running simultaneously. In an embodiment, the data may be responsive to a query implemented on account search module 150. For example, in some embodiments, the data may be narrowed to include data involving a particular buyer 115, or a particular class of collateral, as described in greater detail below. In an embodiment, the data loaded at 210 may be over-inclusive, so to minimize access of database 160, which may otherwise increase network latency when memory/storage device(s) 155 are located away from the one or more processors. In an embodiment, each of a plurality of processors may be associated with only a subset of the deals to manage primarily that subset, however data corresponding to all deals may be loaded into memory associated with each processor, to balance the load of processing said data, regardless of any interrelatedness of the data. For example, in an embodiment wherein process 200 is operable on a clustered computing architecture, each of a plurality of message passing interface (WI) nodes may be responsible for a subset of the deals returned by the query.

Once the data is loaded at 210, process 200 may continue to initialize the data at 215. Data initialization at 215 may be configured to structure the data in a manner that may permit greater efficiency of data handling further in process 200. In some embodiments, initializing the data at 215 may include locking the dealer boxes, repo accounts, and concentration limits (e.g., for the duration of the allocation, to ensure that another allocation or unwind processes does not access the same resources in parallel with another allocation running at the same time). Data initialization at 215 may include at 220 performing eligibility testing of the positions against the rulesets, basket identifier (BID) schedules, and collateral preference schedules (CPS) for all relevant deals. In an embodiment, only the MPI nodes responsible for a given subset of the deals will test eligibility for those deals. In an embodiment, each node may process multiple deals in parallel, using, for example, an OpenMP architecture. Data initialization at 215 may further include at 225 creating a margin array data structure, such that non-eligible positions for a given deal will have a margin of zero, while eligible positions will have their margin or haircut loaded into the structure. In an embodiment, the margin array may be a double array indexed by repo number and position number, however may be stored as a single contiguous area of memory. In an embodiment, different parts of the margin array may be populated by different MPI nodes, however may be synchronized across the cluster of MPI nodes. In an embodiment, deals sharing a group level concentration limit are grouped onto the same node so that concentration limit data does not have to be communicated through the cluster to help improve performance. In an embodiment, a load balancing algorithm is used to authorize a node as manager of a specific deal so that each node in the cluster has an equal workload.

Data initialization at 215 may further include at 230 refreshing the margins in database 160 for any margin of the array that is different from previously allocated margins loaded into memory at 210. Such differences may arise, for example, due to changes in security data or rulesets. At 235, data initialization continues with populating a concentration linked list for Repo and position combinations. Such a list may permit allocation and de-allocation of positions by iterating through the linked list to update concentration buckets without reparsing the ruleset to identify applicable concentration limits. In an embodiment, concentrations that were not correctly populated in database 160 for previously allocated positions are refreshed in database 160. Data initialization at 215 may further include at 240 populating a Cost of Carry array, which may be a double array indexed by deal and position. In an embodiment, the Cost of Carry array may be populated by MPI nodes managing their associated deals, and then synchronized across the cluster of MPI nodes. Data initialization at 215 may further include at 245 taking a snapshot of a previous allocation, then returning all previously allocated positions back to a Dealer Box in the memory.

Once data initialization at 215 is completed, process 200 may continue at 250 by performing pre-optimization of the positions for the deals. Such pre-optimization may allow selection of various features for particular deals, which may override optimized or otherwise enhanced allocations performed later in process 200. In an embodiment, pre-optimization at 250 may include at 255 allocating all collateral that is eligible for a given deal to that deal, even if the deal becomes over-collateralized. In an embodiment, any collateral allocated to those deals may be locked, and not utilized for other optimizations. In an embodiment, pre-optimization at 250 may include at 260 a minimum modification feature, which may be associated with a given deal such that an attempt would be made to reallocate any collateral previously allocated to that deal (i.e., indicated in the backup snapshot at 245) back to the deal. In an embodiment, if the position is no longer eligible, would break a concentration limit, or would over-collateralize that deal, then that position might not be allocated, or might be partially allocated. In an embodiment, any position allocated to the deals designated for minimum modification would not be accessed for optimization, or otherwise reallocated for the remainder of process 200. In an embodiment, the deals selected for minimum modification may still have additional positions allocated to it to prevent under-collateralization. For example, if the account is short, additional collateral may be allocated to the deal. Furthermore, if the account is over-collateralized, some collateral may be removed, but not enough to make the account under-collateralized. Again, any collateral already allocated would remain collateral; however this may exclude collateral that is no longer eligible collateral, if the rulesets for the deal are modified. In an embodiment, the allocations during the pre-optimization at 250 may utilize a parallel replacement algorithm, described in greater detail below.

Once the pre-optimization phase at 250 is complete, process 200 may continue with mathematically optimizing the collateral allocations at 270, where the one or more processors may be used to find an allocation of the portfolio that minimizes current required collateral across the plurality of deals. In an embodiment, seller 110 and buyer 115 may agree to allow such movements of the collateral in their deals, either automatically or at the request of one or both parties. Typically, as seller 110 has agreed to buy back the collateral at a later time, seller 110 would be the one who would want to shift collateral, so that additional collateral may be freed up which may be utilized for other purposes. In an embodiment, the mathematical optimization at 270 may also utilize the parallel replacement algorithm, again described below, which may be iterated repeatedly until the portfolio comes fully collateralized, or when the derivative of the weighted average of the previous ten iterations becomes zero or negative.

The mathematical optimization at 270 may include, at 275, indexing and sorting the deals based on position eligibility. In an embodiment, a bipartite graph may be created between the set of positions and the set of deals. Edges may be drawn showing eligibility between the sets of positions and deals. In an embodiment, vertex degrees are calculated for each set, representing the number of edges connecting to each member of the set. In an embodiment, the sorting may include sorting the set by vertex degree, such that repo accounts may subsequently be collateralized in the increasing order of their vertex degrees. Such collateralization may allow allocation of positions which have lower eligibility.

Mathematical optimization at 270 may further include at 280 creating groups of positions, which may be utilized to parallelize the allocation process. In an embodiment, a self organizing map (SOM)/Kohonen map, or other similar neural network technique may be utilized to create the groups. The SOM may use vectors of margins for individual positions as inputs to train the network in a learning mode. A mapping mode may then classify a new input vector. In an embodiment, the SOM algorithm may utilize the Euclidian Distance formula to categorize and group the positions. In an embodiment, the vectors may include the margins for a position applied to each deal. Once the positions are grouped at 280, the position groups may then be sorted at 285. In an embodiment where the best use of margins is the basis for enhancement/optimization, sorting the position groups at 285 may comprise ordering the groups according to the average margins of positions within the group. In an embodiment, the SOM algorithm may be configured to split the position into a number of categories. In an embodiment, the number of categories may be equal to the number of MPI nodes. In some embodiments, the SOM algorithm may ensure that positions in the same category would have similar margins across all associated deals.

As an example, if the margins for each position within each Repo Account (RA) corresponds to what is reflected in Table I below, then when the positions are grouped and sorted as reflected in Table II, the groups may be ordered such that the group with the lowest margins has higher priority in allocation, as follows:

TABLE I

Position Margins

| Positions | Repo Accounts | | | | | | | |
|---|---|---|---|---|---|---|---|---|
| | RA1 | RA2 | RA3 | RA4 | RA5 | RA6 | RA7 | RA8 |
| 023824574 | 1.01 | 1.02 | 1.01 | 1.01 | 1.00 | 1.02 | 1.01 | 1.01 |
| 024519660 | 1.05 | 1.05 | 0.00 | 1.06 | 0.00 | 1.04 | 1.05 | 1.05 |
| 024814742 | 1.01 | 1.02 | 0.00 | 1.01 | 1.00 | 1.02 | 1.01 | 1.01 |
| 025088212 | 1.02 | 1.02 | 1.01 | 1.01 | 1.01 | 1.02 | 1.01 | 1.01 |
| 026104335 | 1.06 | 1.06 | 1.07 | 1.05 | 0.00 | 1.06 | 1.05 | 0.00 |
| 026649103 | 1.01 | 1.02 | 1.02 | 1.03 | 1.01 | 0.00 | 1.01 | 1.01 |

TABLE II

Group sorting

| | Position Groups | | | | | |
|---|---|---|---|---|---|---|
| | Group 1 (G1) | | Group 2 (G2) | | Group3 (G3) | |
| Repo Accounts | 23824574 | 24814742 | 25088212 | 26649103 | 26104335 | 24519660 |
| RA1 | 1.01 | 1.01 | 1.02 | 1.01 | 1.06 | 1.05 |
| RA2 | 1.02 | 1.02 | 1.02 | 1.02 | 1.06 | 1.05 |
| RA3 | 1.01 | 0.00 | 1.01 | 1.02 | 1.07 | 0.00 |
| RA4 | 1.01 | 1.01 | 1.01 | 1.03 | 1.05 | 1.06 |
| RA5 | 1.00 | 1.00 | 1.01 | 1.01 | 0.00 | 0.00 |
| RA6 | 1.02 | 1.02 | 1.02 | 0.00 | 1.06 | 1.04 |
| RA7 | 1.01 | 1.01 | 1.01 | 1.01 | 1.05 | 1.05 |
| RA8 | 1.01 | 1.01 | 1.01 | 1.01 | 0.00 | 1.05 |
| Position Avg | 1.01 | 1.01 | 1.01 | 1.02 | 1.06 | 1.05 |
| Group Avg | 1.01 | | 1.01 | | 1.05 | |
| Sort Order | 1 | | 2 | | 3 | |

In an embodiment, where two groups have the same average margins (such as G1 and G2 in the example of Table II), then the group having positions with the lower eligibility may be awarded the higher priority. In some embodiments, once the groups are sorted at 285, the mathematical optimization at 270 may continue with assigning the deals among nodes at 290. In some embodiments, the deals are assigned to groups as part of loading the data at 210. Such assignment may be performed to parallelize the collateral allocation process. In an embodiment, a deal or a group of deals may be assigned to a particular node based on maximum/minimum concentration limits. As noted above, in some embodiments the deals may be balanced to the MPI nodes, which in some cases may account for group level concentration limits, whereby deals sharing a group level concentration limit are assigned to the same node, while other deals are split across the remaining nodes. In an embodiment, only the MPI node managing a particular deal would allocate collateral to that deal, while any MPI node could de-allocate collateral from a given deal. In an embodiment, the number of nodes would equal the number of position groups for maximum efficiency. In an embodiment, the position groups may be rotated across the MPI nodes so that all nodes have an opportunity to allocate any position from any position group. In an embodiment, the position groups are assigned to a node using pipeline architecture to ensure that lowest margin collateral are considered first for allocation. An example of such allocation is depicted in Table III below.

TABLE III

Pipeline Architecture Allocation

| Time-cycles → | T1 | T2 | T3 | T4 | T5 |
|---|---|---|---|---|---|
| Node 1 | G1 | G2 | G3 | | |
| Node 2 | | G1 | G2 | G3 | |
| Node 3 | | | G1 | G2 | G3 |

Once the groups are sorted in order of their vertex degrees, and in various embodiments assigned to particular nodes, the mathematical optimization at 270 may continue at 295 by performing a maximal allocation. In an embodiment, the maximal allocation may comprise sorting Repo Accounts by ascending order of vertex degree, based on positions in the Dealer Box. The maximal allocation may continue by sorting the sorted Repo Accounts by the vertex degree based on position in an Allocated Securities Box (although in the first iteration of the maximal allocation at 295, the Allocated Securities box would be empty). Maximal allocation at 295 would continue with the position groups being arranged such that those with the lowest average of margins are allocated first.

Following the maximal allocation at 295, some of the RAs may be left undercollateralized, with some collateral still left in the Dealer Box. A replacement procedure may be implemented at 300 to swap some of the collateral in the fully collateralized repo accounts with the remaining eligible collateral in the Dealer Box, and reallocate the freed up collateral to the undercollateralized deals. As above, eligibility may be ascertained by any appropriate mechanism, including but not limited to allowance by buyer 115 in rulesets associated with the deals, preference by seller 110 through the BID schedule, or so on. In an embodiment, the reallocation may again give greater importance to the margins. In an embodiment, the replacement procedure at 300 may comprise sorting the RAs first by vertex degree based on the positions left in the Dealer Box, then by vertex degree based on the positions now in the Allocated Securities box. During the replacement allocations, securities in the Dealer Box would be considered first, before securities in the Allocated Securities box. The undercollateralized accounts would continue to be collateralized with securities from the Allocated Securities box, once the eligible collateral in the Dealer Box is depleted. In an embodiment, the replacement procedure at 300 may be iterated across all accounts until all accounts are fully collateralized, or there is a shortage of collateral. In an embodiment, the replacement procedure at 300 may utilize the bipartite graph method to establish priorities for the replacement collateralization.

An example of the mathematical optimization performed at 270 is depicted in FIG. 3, wherein the complete collateralization of all Repo Accounts R1-R8 is accomplished in three iterations (Iter 0, Iter 1, and Iter 2). For each iteration, the number of securities allocated (SA) to a given account is presented, as well as the number of eligible securities in both the Dealer Box (DB) and the number of eligible securities in the Allocated Securities box (AS). As shown, the order that the Repo Accounts are presented following the replacement procedure reflects the order in which the Repo Accounts are collateralized during that procedure: ascending in order based on the number of eligible securities in the DB, followed by the number of eligible securities in the AS, (or R6→R8→R2→R7→R4→R1→R5→R3). When making the collateral available, it would be in the reverse order, starting with what is left in the DB (i.e., DB→R3→R5→R1→R→4→R7→R2→R8→R6). For example, when allocating collateral to account R6 in Iter 2, the collateral considered first will be the eligible collateral in the DB (sorted internally by margins) followed by the eligible collateral that was allocated to R3 (sorted internally by margins) in Iter 1, followed by R5 in Iter 1, and so on. By proceeding in this manner, collateral is being taken from accounts that still have a large amount of eligible collateral left in the Dealer Box, before moving on to taking collateral from Repo Accounts that have more limited amounts of eligible collateral.

A stopping point for the mathematical optimization at 270 may be determined by any suitable determination criteria. In an embodiment, the mathematical optimization at 270 may simply proceed for a predetermined number of iterations. In another embodiment the stopping point for the mathematical optimization at 270 may be ascertained from a moving average calculated from the prior iterations. As shown in the illustrated embodiment of process 200 in FIG. 2A, after the replacement process is run at 300, it may be determined at 305 if an optimal collateral allocation has been ascertained. If not, then the mathematical optimization at 270 may continue by returning to 295 for further collateral reallocations. In an embodiment, the optimal collateral allocation may be selected from the processed iterations of the replacement process 300 at a stopping point for the optimization calculations. An example of ascertaining the optimal collateral allocations at 305 is depicted in the example collateralization table presented in Table IV.

TABLE IV

Optimized Collateralizations for a given Repo Account

| Iteration # | Under-collateralized Amount | Moving Avg (From Prior Ten Iterations) | Slope (From Prior Ten Moving Averages) |
|---|---|---|---|
| 1 | 51,724,121,266.26 | | |
| 2 | 15,285,759,313.30 | | |

TABLE IV-continued

Optimized Collateralizations for a given Repo Account

| Iteration # | Under-collateralized Amount | Moving Avg (From Prior Ten Iterations) | Slope (From Prior Ten Moving Averages) |
|---|---|---|---|
| 3 | 15,275,400,741.39 | | |
| 4 | 15,265,605,535.34 | | |
| 5 | 15,263,662,725.20 | | |
| 6 | 15,263,496,654.97 | | |
| 7 | 15,196,739,680.91 | | |
| 8 | 15,193,430,765.45 | | |
| 9 | 15,183,291,443.73 | | |
| 10 | 15,183,267,729.92 | 18,883,477,585.65 | |
| 11 | 15,174,152,224.71 | 15,228,480,681.49 | |
| 12 | 15,181,803,807.26 | 15,218,085,130.89 | |
| 13 | 15,184,771,409.55 | 15,209,022,197.70 | |
| 14 | 15,185,985,755.57 | 15,201,060,219.73 | |
| 15 | 15,177,743,295.89 | 15,192,468,276.80 | |
| 16 | 15,188,312,786.22 | 15,184,949,889.92 | |
| 17 | 15,178,028,120.29 | 15,183,078,733.86 | |
| 18 | 15,182,510,080.73 | 15,181,986,665.39 | |
| 19 | 15,194,587,124.58 | 15,183,116,233.47 | −3,700,361,352.17 |
| 20 | 15,189,709,194.54 | 15,183,760,379.94 | −44,720,301.56 |
| 21 | 15,179,768,127.28 | 15,184,321,970.19 | −33,763,160.69 |
| 22 | 15,177,527,310.43 | 15,183,894,320.51 | −25,127,877.19 |
| 23 | 15,179,533,232.17 | 15,183,370,502.77 | −17,689,716.95 |
| 24 | 15,184,357,609.62 | 15,183,207,688.18 | −9,260,588.62 |
| 25 | 15,172,461,886.99 | 15,182,679,547.29 | −2,270,342.64 |
| 26 | 15,178,898,307.02 | 15,181,738,099.37 | −1,340,634.49 |
| 27 | 15,171,085,519.12 | 15,181,043,839.25 | −942,826.14 |
| 28 | 15,168,148,512.90 | 15,179,607,682.46 | −3,508,551.01 |
| 29 | 15,177,237,711.56 | 15,177,872,741.16 | −5,887,638.77 |
| 30 | 15,171,969,148.08 | 15,176,098,736.52 | −8,223,233.68 |
| 31 | 15,168,954,314.80 | 15,175,017,355.27 | −8,876,965.24 |
| 32 | 15,169,906,453.98 | 15,174,255,269.62 | −9,115,233.15 |
| 33 | 15,175,691,281.00 | 15,173,871,074.51 | −9,336,613.67 |
| 34 | 15,185,598,578.23 | 15,173,995,171.37 | −8,684,375.92 |
| 35 | 15,171,045,961.44 | 15,173,853,578.81 | −7,884,520.55 |
| 36 | 15,175,794,410.25 | 15,173,543,189.14 | −7,500,650.11 |
| 37 | 15,164,822,445.27 | 15,172,916,881.75 | −6,690,800.71 |
| 38 | 15,175,593,402.76 | 15,173,661,370.74 | −4,211,370.42 |
| 39 | 15,171,130,798.57 | 15,173,050,679.44 | −3,048,057.08 |
| 40 | 15,175,304,543.67 | 15,173,384,219.00 | −1,633,136.27 |
| 41 | 15,174,472,655.12 | 15,173,936,053.03 | −319,216.59 |
| 42 | 15,172,036,275.24 | 15,174,149,035.16 | 277,960.65 |

As shown in Table IV, in an embodiment a weighted average of the undercollateralized amount may be calculated from the previous ten iterations of the replacement process at 300. The "undercollateralized amount" indicates the amount by which the account is undercollateralized at the end of the maximal allocation process at 295. The Replacement algorithm at 300 attempts to collateralize this amount by swapping eligible collateral between RAs and the Dealer Box, before allocating the collateral to the given RA. The slope may then be calculated, representing the difference between the current iteration's weighted average and the weighted average of the tenth prior iteration. In an embodiment, the stopping point may be ascertained when this slope becomes greater than or equal to zero. In Table IV, the stopping point is reached with iteration 42, where the slope becomes positive. The optimal allocation, having the least undercollateralized amount, may then be selected from the calculated iterations, which in the example of Table IV is found in iteration 37.

During the swapping of collateral, it may be observed that the replacement algorithm at 300 continues to run iteratively despite there not being any eligible collateral available in any of the accounts. In an embodiment, instead of a set number of iterations being run, as was depicted in Table IV, the optimized collateral allocation determination at 305 may detect when the collateralization value has become constant, indicating a lack of further eligible collateral, recognizing that as a termination point. In an embodiment, the optimized collateral allocation determination at 305 may ascertain that the iteration should terminate when the under-collateralized amount becomes zero. In an embodiment, if the moving average value over ten iterations remains constant or increases, the allocation may be ascertained at 305 to be complete. The moving average may be a greater determination of optimal collateralization, because in cases where larger collateral is swapped for smaller collateral, the under-collateralized amount value may increase for that particular iteration, however, this may decrease again in subsequent iterations, and it may be desirable to continue the iterations of the replacement process at 300.

Figure 2B:
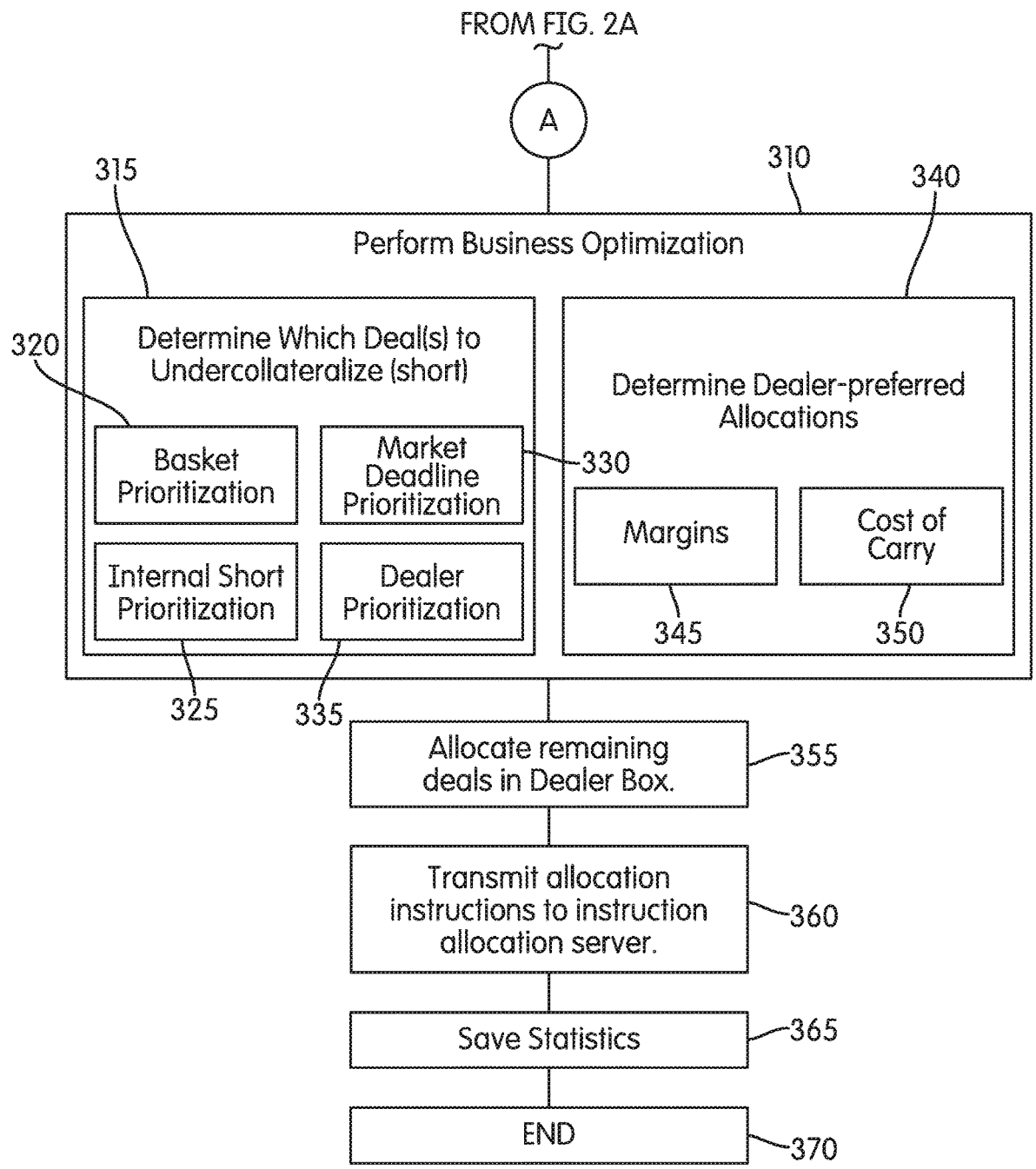

Once it is determined at 305 that the collateral allocations have been mathematically optimized, the mathematical optimization at 270 may end, and process 200 may continue to A, which continues at FIG. 2B. As is shown in FIG. 2B, process 200 may continue at 310 with a business optimization of the collateral. In an embodiment, the business optimization at 310 may be implemented if there is insufficient collateral to collateralize the entire portfolio. In an embodiment, a determination of which deal or deals should be left undercollateralized may be made at 315. In an embodiment, multiple considerations may exist, which may be used together and prioritized by seller 110 and specified via operator I/O & display 165, as described in greater detail below. In an embodiment, one such consideration may include basket prioritization 320. Basket prioritization 320 may prioritize deals classified as basket trades or having BID schedules over deals that are not classified as basket trades, or do not have BID schedules. In an embodiment, another such consideration may include internal short prioritization 325. Internal short prioritization 325 may collateralize older deals ahead of newer deals. In an embodiment, another consideration may include market deadline prioritization 330. Such market deadline prioritization 330 may prioritize deals that accept collateral only from markets which are closed ahead of deals that only accept collateral from markets which are still open. In yet another embodiment, another consideration may include dealer prioritization 335, wherein the dealer (i.e., seller 110) may specify particular deals to have a higher prioritization. Again, such demarcation of higher priority deals may be specified via operator I/O & display 165, or any other interface with the collateral allocation system running process 200. The implementation of the undercollateralization determination at 315 may be by any suitable mechanism, including but not limited to via the parallel replacement mechanism of the mathematical optimization described above.

As further shown, the business optimization at 310 may further include at 340 determining which of a dealer's preferred collateral should be allocated to a deal. The dealer's preferred collateral may be of any appropriate type, and may correspond, for example, to the dealer's BID schedule, and the intersection of the BID schedule with the deal's ruleset (which may specify the collateral acceptable to buyer 115). In an embodiment, any collateral that is allocated with a higher cost of carry may be swapped with eligible collateral still in the Dealer Box that has a lower cost of carry. In an embodiment, any collateral that is allocated with a higher margin may be swapped with eligible collateral still in the Dealer Box that would have a lower margin. In an embodiment wherein deals are associated with particular MPI processes, deals may be processed in parallel using shared memory programming within the same MPI node. In an embodiment, for each Repo deal managed by an MPI process, priority may be established as either by margins 345 or by Cost of Carry 350. For each deallocation position equal to the position DESC (in SQL syntax) that is allocated to the deal, and for each allocation position equal to the allocation ASC (in SQL syntax) that is available in the Dealer Box, the dealer preferred collateral determination at 340 may include breaking out of the position DESC and position ASC loops if the allocation position is equivalent to the deallocation position. Otherwise, the determination algorithm may comprise deallocating the deallocation position, allocating the allocation position, and trying to fully collateralize the deal with the position that was de-allocated. If the deallocation position was fully removed, the loop over all MPI nodes may end. In prioritizing by margin at 345, if a position is eligible for two different deals, if there is a lower margin in one deal, it should be allocated to that deal so that fewer positions are used to collateralize the portfolio. In prioritizing by Cost of Carry at 350, seller 110 may analyze the collateral from a risk/desirability standpoint, determining which collateral is the cheapest to deliver, and how they believe the collateral's value will change during the course of the deal.

Although in some embodiments, other business optimizations may be included in the business optimization at 310, in an embodiment process 200 may continue at 355 with a final allocation of deals in the Dealer Box. In an embodiment, these final allocations at 355 may be utilized to collateralize the portfolio of deals if there are any positions in the Dealer Box after both the mathematical optimizations at 270 and the business optimizations at 310. In an embodiment, the parallel replacement algorithm may again be utilized for the final allocations at 350.

In an embodiment, process 200 may continue with a submission of allocation instructions at 360. For example, in an embodiment the current allocations that were tracked at 245 may be compared with the optimized portfolio calculated in process 200. The differences between the pre-optimized allocations at 245 and the newly optimized allocations may be forwarded to a separate instruction allocation server, which may utilize instructions from a collateral optimization server, such as collateral management system 140, to implement the optimized instructions across the deals. In an embodiment, removal of positions that shouldn't be allocated would be performed by the instruction allocation server first, followed by a reallocation of collateral to new deals. In an embodiment, if there exists an instruction where the position cannot be allocated due to eligibility, concentration limits, or so on, the instruction server may update database 160 or another storage construct with the reason for the failure. In an embodiment, the instruction allocation server may then perform the remaining position movements, collateralizing the deal associated with the erroneous instruction at a later time.

In some embodiments, the instruction allocation server may be configured to perform position movements so as to minimize financial exposure to the Tri-Party agent, or other similar party. Some embodiments may be configured to minimize cash exposure. Some embodiments may be configured to control net free equity (NFE) exposure (e.g., unused collateral that the party has lien on). As an example, where collateral is removed from multiple accounts before being reallocated, the Tri-Party agent would be exposed for the entire uncollateralized amount over the multiple accounts. However if the collateral were reallocated from some of the accounts to others of the accounts prior to removing collateral from those other accounts, the exposure to the Tri-Party agent would be reduced. As such, in some embodiments the movements of collateral may be ordered to minimize shortage. As shown in the simplified example of Table V, the Tri-Party agent would be exposed by the value of each collateral removed from a given deal.

TABLE V

Example Position Movements to Minimize Shortage/Exposure

| | Scenario A | | Scenario B | |
| --- | --- | --- | --- | --- |
| Movement | Allocation | Aggregate Shortage/ Exposure Amount | Allocation | Aggregate Shortage/ Exposure Amount |
| 1 | Remove Collateral X from Account A | Collateral for A | Remove Collateral X from Account A | Collateral for A |
| 2 | Remove Collateral Y from Account B | Collateral for A and Collateral for B | Allocate Collateral X to Account B | Collateral for A |
| 3 | Allocate Collateral X to Account B | Collateral for A | Remove Collateral Y from Account B | Collateral for A |
| 4 | Allocate Collateral Y to Account A | NONE | Allocate Collateral Y to Account A | NONE |

In Scenario A, between steps 2 and 3, the Tri-Party agent would be exposed by the value of collateral owed to Account A plus the value of collateral owed to Account B. In Scenario B, however, by allocating Collateral X to Account B immediately after removing it from Account A, Account B is never shorted, reducing the exposure to the Tri-Party agent. In more complicated embodiments, where collateral is being reallocated over and between a greater number of accounts, any number of determination criteria may be utilized to ascertain the order of deallocation and reallocation, to reduce exposure to the Tri-Party agent. In some embodiments, multiple movements may be processed together (i.e., as a single transaction), which may also reduce or eliminate exposure to the Tri-Party agent. For example, if Movements 1-4 of either Scenario A or Scenario B were performed as a single transaction, then there would not be any exposure to the Tri-Party agent, as the account holders would never see a shortage to the deals in their accounts. In some such embodiments, an automatic cash crediting system for providing credit from the Tri-Party agent to shorted accounts may calculate at a transaction level, comparing differences in exposure at the start of the transaction to the end of the transaction.

Returning to FIG. 2B, in some embodiments, statistics regarding the data initialization at 215, and/or the optimized allocations calculated in process 200 may be saved at 365. In an embodiment, the save may be made to durable memory, such as memory/storage device(s) 155 of collateral management system 140. In an embodiment, the statistics may be recorded to database 160. As noted, such statistics may include collateralization failures, however may also include any other information calculated during process 200, including but not limited to data regarding margins and cost of carry. Finally, process 200 may end at 370.

As indicated above, in an embodiment optimization may include consideration of BID schedules. In an embodiment wherein there is insufficient collateral for a given deal, upgrades may also be considered for the deals. For example, in an embodiment a CPS (or an "upgrade" schedule) may be utilized to prioritize collateral allocation. In an embodiment, the eligibility of collateral may be simply indicated in the margin array. In an embodiment, during the dealer preferred allocations 340 of the business optimizations at 310, collateral with a high cost of carry (determined by the CPS) may be swapped with collateral of a lower cost of carry, which would utilize the CPS in a descending direction. In an embodiment, the CPS may determine eligibility of collateral in the ascending direction, while dealer preferred collateral may be ascertained by reading the CPS in the descending direction.

In an embodiment, if a given deal reaches a specified maximum number of positions, an extra check may be performed after allocating each position. In an embodiment, if the number of positions equals the maximum allowable position count, and if the current required collateral of the deal is greater than zero, then the smallest allocated position may be removed, which may allow for the potential of a larger position to be allocated.

As noted above, in an embodiment, the parallel design of the computation of the deals is appreciated, wherein various memory locks may be implemented to prevent multiple processes from allocating positions to the deal. In an embodiment, however, any MPI process may be configured to remove any position from any deal, regardless of whether the specific MPI process is responsible for managing that deal. In an embodiment, groups of RAs may be allocated using a pipeline architecture, such that in a first time-cycle, a first node will process a first group G1, while in a subsequent time-cycle, the first node will process a second group G2, while a second node will process the first group G1. Such grouping of positions may allow multiple MPI processes to allocate in parallel, preventing multiple processes from allocating the same position at the same time. In an embodiment, the grouping of positions may permit allocation of the lowest average margin positions, which can reduce the number of positions used to collateralize the portfolio of deals. In an embodiment, the positions are synchronized across the MPI nodes between each time-cycle allowing each MPI node to know the current state of all positions in the group it is about to allocate from in the next time-cycle.

The system and method of this disclosure may be implemented in various ways. For example, as noted above, access to collateral management system 140 may be provided via operator I/O & display 165. In an embodiment, operator I/O & display 165 may be accessible over network 130, such that seller 110 and/or buyer 115 may have access to collateral allocation module 180, for example. In an embodiment illustrated in the "screenshot" of FIG. 4, graphical user interface (GUI) indicated generally by Letter "A" may be provided to facilitate such access to collateral management system 140. As shown, a GUI "A" may allow creation or modification of an allocation template identified at Letter "B", which may permit a user of GUI "A" to establish preferences for process 200 to optimize collateral allocations. At Letter "C", pre-optimization options may be established. In an embodiment, the pre-optimization options may correspond with the pre-optimization at 250. In the illustrated embodiment, pre-optimization options "C" for allocation template "B" permit selectively enabling the minimize modifications features 260, which again would attempt to reallocate any collateral previously allocated to a given set of deals. In an embodiment, different accounts and/or deals that are added or controlled over post-trade management system 100 may selectively be associated with a minimum modification (MINMOD) tag, such that if the minimize modifications feature 260 is enabled in pre-optimization options "C", the collateral allocation module 180 would attempt to retain the collateral as allocated to those accounts.

Optimization options for mathematical optimization 270 in allocation template "B" may be controlled at Letter "D". As shown, a number of features are controllable in the illustrated embodiment. For example, in an embodiment, a Fussy Factor may be presented, giving a user of the GUI "A" the ability to establish a percentage of a position that is allocated in each iteration of the optimization. A Forced Fussy Factor option may control how strictly the Fussy Factor is enforced. In an embodiment, a Full Replacement option may be presented to control the number of passes that may be run in a full replacement algorithm for the optimization. An option may be presented to selectively include MINMOD tagged accounts in the replacement procedure at 300. Furthermore, it may be selected that the replacement algorithm at 300 may run the deals with an older stat date option, or a lower priority option. Another option presented in the optimization options "D" may include a number of times to retry the optimization and/or post-optimization phases (i.e., mathematical optimization 270 and business optimization 310).

At Letter "E" options for the business optimization at 310 are presented. As shown, there may be separate sections for both the determining of which deals to short at 315, and the determining dealer-preferred allocations at 340. As shown, the user of GUI "A" may prioritize from basket prioritization 320, internal short prioritization 325, market deadlines 330, and dealer priority at 335. Again, for basket prioritization at 320, accounts assigned to a basket tag should be allocated before accounts not assigned to a basket tag. With internal short prioritization 325, deals with older state dates, still undercollateralized, would be allocated before accounts with earlier start dates. In market deadline prioritization 330, accounts with closed Markets would be allocated before accounts with open markets. In dealer prioritization 320, undercollateralized deals with lower priority would be allocated before accounts with higher priority. In the dealer-preferred allocations at 340, the options presented in some embodiments may include assigning a priority to use better margins compared to the cost of carry. Likewise, a priority may be assigned to use a cost of carry profile as compared to a better margin profile.

Although the options depicted in letters "C", "D" and "E" are presented as drop-down lists that permit selection of "Yes," "No," numerical elements (such as for prioritization or percentages) and so on, other graphical user interface elements may also or alternatively be utilized in GUI "A". For example, a series of push buttons or radio buttons may be presented to make the applicable options selections. Furthermore, in some embodiments a text based interface (or a text base element in a GUI) may be utilized, allowing a user to type in an applicable response to an option prompt. In some embodiments, combinations of GUI and text elements may be utilized. For example, at Letter "F", instructions for the instruction allocation server are input. As shown, the applicable Dealer ID (identifying seller 110, for example) is a text interface, while a "submit" dropdown box allows for a constant, intermittent, or delayed submission of the optimization instructions to the instruction allocation server.

Shown at letter "G" is a pushbutton that would reset the values input at letters "C" through "F" to default values. Such default values may be, for example, all "NO" responses, all "YES" responses, zeroed numerical prioritizations, or so on. In an embodiment, the default values implemented by the reset pushbutton "G" may be the most commonly implemented response for each optimization element. Pushbutton "H" is a submission pushbutton, configured to accept the responses established for allocation template "B". As shown, pushbutton "H" is a preview pushbutton, which would advance the user to a summary page depicted in the screenshot of FIG. 5. As seen in FIG. 5, a reporting of the selections made for allocation template "B" is presented at Letter "I", allowing a user of GUI "A" to review his or her responses. If an error has been made in a response, a cancel pushbutton is provided at Letter "J", returning the user to the screen depicted in FIG. 4, allowing editing of allocation template "B". In an embodiment, all responses in made previously to allocation template "B" will remain, so that a user need only change the source of the error. If the allocation template review at "I" is correct, a confirmation pushbutton is provided at letter "K", saving the allocation template responses. In an embodiment, the name identifying application template "B", by which the template responses may be saved under, is established prior to accessing the options for allocation template "B". In other embodiments, a space to label or otherwise demark a template name for the optimization configurations may be provided either in the editing screen of FIG. 4, the preview report of FIG. 5, or following confirmation through pushbutton "K". Clicking of the confirmation button "K" may in an embodiment save the selected options in memory/storage device(s) 155. In an embodiment, the selected options may be recorded in database 160, and may be associated with some or all deals for associated with seller 110. In an embodiment seller 110 may run the optimization for deals associated with a particular buyer 115, or a series of buyers 115 all associated with the Tri-Party agent.

In an embodiment, a portion of GUI "A" may allow for a listing of previously created templates, and the ability to create new templates. In FIG. 6, a new template may be added at Letter "L", wherein a template name may be input in the textbox at letter "M". After clicking on the add button at Letter "N", the allocation template editing screen of FIG. 4 may be presented, and would ultimately be saved under the specified template name. As further shown in FIG. 6, previous templates may be listed at Letter "0", along with the option of modifying the templates, copying the options from the template into a new template having a new name, or deleting the templates. In the illustrated embodiment, allocation template "B" appears on the list, wherein clicking the modify button indicated at Letter "P" would return to the view of FIG. 4.

As illustrated in FIG. 7, in an embodiment a portion of GUI "A" may provide user input to apply the settings of an allocation template, such as allocation template "B" established in FIG. 4, to optimize collateral allocations from the Dealer Box. As shown, the allocation template may be selected at Letter "Q". In the illustrated embodiment, the allocation template is selected by a dropdown box, however in other embodiments the allocation template may be searched for, identified by a text-box, or by any other suitable mechanism. In the illustrated embodiment, allocation template "B" established in FIG. 4 is selected in the dropdown box at Letter "Q". As shown, in an embodiment the allocations may be performed by designating a particular Dealer Box, and a particular Dealer ID, as is shown generally at Letter "R". In other embodiments a dealer allocation group may be selected or otherwise designated to submit an allocation, as may be selected by clicking on the tab indicated at Letter "S".

FIG. 8 illustrates that in an embodiment, after an allocation is submitted the status of the allocation may be presented through a portion of GUI "A". As shown, the allocation may be searched by a number of associated criteria presented generally at Letter "T", including but not limited to allocation date, allocation status, allocation type, Dealer or Purchaser ID, allocation ID, Dealer Box, dealer allocation group, basket ID, combinations thereof, or so on. In the illustrated embodiment, basic selection criteria that includes at least a date range for the allocations may be combined with more particular selection criteria (i.e., the dealer/purchaser IDs, the allocation ID, the Dealer Box, the dealer allocation group, or the Basket/Purchaser IDs) when searching an allocation history. By entering the associated search information and clicking the find buttons "U", the associated allocations may be presented, such as is depicted in FIG. 9.

In the embodiment of GUI "A" depicted in FIG. 9, the allocations associated with the search terms entered at Letter "T" in FIG. 8 are presented, and may include at Letter "V" the status of the optimization process described above. As shown, in an embodiment, the status of completed optimizations may be indicated as "done", while "in progress" may designate that an optimization is under way for the associated allocation ID. Also shown is that certain allocations may be designated as "abort", which may indicate the failure of the allocation procedure. In an embodiment, clicking on the "abort" indicator may present information as to the reason for the abortion of the optimization procedure, such as an improper ruleset configuration, a computer failure, a time-out, or so on. In an embodiment, selecting the allocation ID indicated generally at Letter "W" from the allocation history results illustrated in FIG. 9 may provide a detailed description page, such as that depicted in FIG. 10.

FIG. 10 illustrates a detailed description page of GUI "A", which may correspond to the allocation ID "W" selected in FIG. 9. As shown, the allocation template utilized for the selected allocation (which in the illustrated embodiment is allocation template "B" established in FIG. 4) may be listed, as well as the associated report for the allocation. As shown, a dropdown box "X" may provide different types of report data associated with the allocation. For example, in the illustrated embodiment, the initial screen may indicate the current amount of collateral associated with or needed in the selected allocation. In an embodiment, other reports may also or alternatively be provided, such as by selecting a different report type from the dropdown box "X". In an embodiment, the reports may include a list of the allocated positions by the Cost of Carry. For example, the report may allow comparison based on account ID, security ID, ID type, depository, Dealer Box, par, collateral value, CPS ruleset, and/or the Cost of Carry number. In an embodiment, the reports may be for all positions, including unallocated positions. In an embodiment, the weighted average of the Cost of Carry for the allocated positions may be provided, where the weight is determined by the size of the positions. In an embodiment, the positions that indicate zero Cost of Carry (i.e., the Cost of Carry could not be derived) are presented, so that a user may determine a gap in their schedule designations (i.e., in the CPS) that prevents complete prioritization. In an embodiment, the weighted margins for the account(s) are presented, to indicate the excess in collateral provided for a given account. Other reports are possible, and the reports described above are provided solely as examples of how data may be presented to users, so that users may use the GUI "A" to determine if or how to best make associated collateralization decisions. As further shown in FIG. 10, once a user of GUI "A" is fished viewing the allocation reports, they may press the button "Y" that may return them to the allocation history list of FIG. 9.

It may be appreciated that in some embodiments, the optimizations described above (e.g., the mathematical optimization at 270), or alternative optimizations, may be implemented as mathematical models configured with multiple objective functions. At the system level, such optimization may include two main steps: (1) determine the optimal collateral allocation configuration, which may be known as an end state optimization, and (2) generate and execute instructions to realize allocation changes for transitioning to the optimal allocation configuration from an existing one. Due to the potential very large number of data record changes and the limited number of changes that can be accommodated in a single system transaction, a transition to the end state may be executed as multiple individual transactions involving a number of intermediate configurations that satisfy the appropriate constraints. Such determining the intermediate configurations may give rise to transition state optimization. As described in greater detail below, the handling of the multiple objectives may be treated differently across embodiments.

In an embodiment, the objectives may be implemented one at a time, where the optimal value for a given run will be taken and used to re-code the objective as a constraint while the model is re-run for the next objective function. In an embodiment, this may be implemented in such a way that the objectives and ordering of the objectives may be configured independently for each dealer. In an embodiment, the independent configuration may be implemented for each run of the optimization.

The end state optimization and the transition state optimizations described below are described with reference to set theory, and in particular do so according to the following conventions:

B is the set of borrowers, L is the set of lenders, and K is the set of collaterals.

$D_{b,l} = \{d_{b,l}: b \in B, l \in L\}$: the set of deals d between borrower b and lender l. As used below, the index b and l may be dropped in a context when their meaning is evident.

$D_l = \cup_{b \in B} D_{b,l}$ represents the set of deals of a lender l, while $D_b = \cup_{l \in L} D_{b,l}$ represents the set of deals of a borrower b, and $D = \cup_{b \in B, l \in L} d_{b,l}$ represents all deals.

The value $p_k$ represents the par amount of a collateral k. Defined to be an integer, it is the fundamental variable in the collateral allocation optimization. The par amount $p_k$ of a given quantity $q_k$ of collateral k is determined by $$p_k = \text{Int}\left(\frac{q_k}{U_k}\right),$$

where $U_k$, the mult par (unit tradable amount) of collateral k, is a unit that represents the minimal number of shares can be allocated, and Int(x) represents the integer part of x. The par amount $p_k$ may be normalized such that $p_k$=(par available)/(mult par). It may be appreciated that the value (e.g., in US dollars (USD)) of a par amount $p_k$ may be given by $v_k = \pi_k p_k$, where $\pi_k$ is the cash value of a mult par of k.

$P_k: D \to N_0$: the par amount allocation function, i.e., $P_k(d)$ is the par amount of a collateral k allocated to the deal d. $N_0$ is the set of non-negative integers.

$V: D \to R^+$: the loan value function. Specifically, i.e., V(d) gives the value (e.g., in USD) of a deal d. $R^+$ is the set of positive real numbers. With this function defined, $V_b = \Sigma_{d \in D} V(d)$ represents the total loan amount of a borrower b.

$A: D \to R_0$: the allocated value function, Specifically, $A(d_{b,l})$ gives the margin adjusted value (e.g., in USD) of the collaterals allocated to a deal $d_{b,l}$. $R_0$ is the set of non-negative real numbers. By definition, $$A(d_{b,l}) = \sum_{k \in K} \frac{\pi_k P_k(d_{b,l})}{M_{k,b,l}},$$

where $M_{k,b,l}$ is the margin factor between borrower b and lender l for collateral k.

$P_{k,b}$ represents the par amount of collateral k owned by borrower b.

$P_{k,b}^{(f)}$ represents the par amount of free (unallocated) collateral k owned by borrower b.

In some embodiments, objective functions may be implemented concerning maturing deals and collaterals that are Depository Trust Company (DTC) securities. The DTC may interchangeably be understood as the Depository Trust and Clearing Corporation (DTCC). For the convenience of defining the objective functions below, the indicator functions are defined as follows:

The maturing deal indicator function:

$$I^{(M)}(d) = \begin{cases} 1 & \text{if } d \text{ is a maturing deal} \\ 0 & \text{otherwise} \end{cases}.$$

The DTC collateral indicator function:

$$I^{(DTC)}(d) = \begin{cases} 1 & \text{if } k \text{ is a } DTC \text{ collateral} \\ 0 & \text{otherwise} \end{cases}.$$

$C_b(d)$ represents the intra-day cash credit extended to a borrower b so that its deal d is fully collateralized. With the introduction of $C_b(d)$, from the perspective of tri-party repo collateral management, the state of a borrower b is completely defined.

For a specific deal $d \in D_b$, the quantity min(V(d), $C_b(d)$+A(d)) is called the collateral maintenance level of the deal. Note that when a deal is not fully collateralized, its collateral maintenance level is the sum of the margin adjusted USD value of the allocated collaterals and any intra-day cash extended to it.

The tuple $S^{(b)} = (\{C_b(d), d \in D_b\}, \{P_{k,b}^{(f)}, k \in K\}, \{P_k(d), k \in K \text{ and } d \in D_b\})$ represents the state of a borrower b from tri-party repo collateral management perspectives. The tuple and its components will be used to formulate end state and transition state optimization. Since the current scope of end state and transition state optimizations focus on a given borrower, the superscript b of S(b) will be dropped when its presence is evident in context.

Furthermore, the step function $\theta(x)$, utilized below, is defined by $$\theta(x) = \begin{cases} 1 & \text{if } x > 0 \\ 0 & \text{if } x \leq 0 \end{cases}.$$

In applying the conventions above, it may be appreciated that in an embodiment an end state optimization may seek to determine an optimal allocation of collaterals of the deals owned by the borrower. For example, the end state optimization may attempt to find the values of the functions $P_k(d)$ when $d=d_{b,l}$ for all of the deals $d_{b,l} \in D_b$ and $k \in K$. It may be appreciated that in an embodiment the outcome of the optimization may be a set of integer vectors that each give the collateral allocation of a deal. A component of a vector for a specific deal may give the par amount of a collateral allocated to the deal.

In some exemplary implementations, a typical borrower may have hundreds of deals and tens of thousands of collateral positions. This may determine the overall dimension of the configuration space of the optimization problem to be about $10^6 \sim 10^8$ order with about $10^4 \sim 10^6$ constraints.

The subsections below describe the constraints and objective functions of an embodiment of end state optimization. It should be noted that end state optimization may be specific to a given borrower. As such, the borrower label b may be dropped in all quantities where its use would be evident in context.

In the embodiment, the optimization may be constrained in that an allocated amount would be non-negative integer: $P_k(d) \in N_0$. Also, an allocated par amount would not be greater than what a borrower owns: $\in_{d \in D_b} P_k(d) \le P_{k,b}$, where $P_{k,b}$ is the par amount of the collateral k owned by borrower b. Additionally, an allocated par amount would be greater than a threshold if allocated: $P_k(d_{b,l}) \in \{0\} \cup [\max(P_{k,b,l}^{(min)}, P_k^{(min)}, +\infty)$, where $P_{k,b,l}^{(min)}$ is the minimal par piece size between borrower b and lender l for collateral k, and p(min) is the minimal par size for the collateral k.

A general concentration limit constraint may also be imposed: $\in_{d \in D_{b,l}} \Sigma_{k \in K} C_{\alpha,l}(k,d) \le C_{\alpha,b,l}^{(max)}$, where $\alpha$ identifies a specific concentration constraint. $C_{\alpha,l}(k, d)$ may be understood as a concentration function for collateral k and deal d. $C_{\alpha,b,l}^{(max)}$ may be understood as the concentration limit.

As an example of the concentration function (e.g., with USD currency concentration): $\in_{d \in D_{b,l}} \Sigma_{k \in K} \pi_k P_k(d) I^{(USD)} \le V_{USD,b,l}^{(max)}$, where $V_{USD,b,l}^{(max)}$ is the USD concentration limit defined between b and l, and $I^{(USD)}(k, d)$ is an indicator function that defines deals and collaterals participation. For example:

$$I^{(USD)}(k, d) = \begin{cases} 1 & \text{if } k \text{ and } d \text{ participate in the USD concentration limit constraint} \\ 0 & \text{otherwise} \end{cases}$$

It may be understood that the currency constraint may use collateral value that is not margin adjusted. In some implementations, margin adjusted value arguably should be used, such as in the extreme case when the margin factor of a collateral goes to infinity. In such a situation, however, the collateral and its allocation would not be financially relevant.

A maximal par concentration limit may also be defined, $\in_{d \in D_{b,l}} \Sigma_{k \in K} P_k(d) I^{(MP)} \le P_{b,l}^{(max)}$, where $P_{b,l}^{(max)}$ is the maximal par concentration limit defined between b and l, and $I^{(MP)}(k, d)$ is an indicator function that defines deals and collaterals participation. For example:

$$I^{(MP)}(k, d) = \begin{cases} 1 & \text{if } k \text{ and } d \text{ participate in the maximal par concentration limit constraint} \\ 0 & \text{otherwise} \end{cases}$$

For a weighted average of maturity: $\in_{d \in D_b} \Sigma_{k \in K} \pi_k P_k(d) I^{(M)}(k, d) T_k \le T_{b,l}^{(max)} \cdot \in_{d \in D_b} \Sigma_{k \in K} \pi_k P_k(d) I^{(M)}(k, d)$, where $T_k$ may be the months to maturity for the collateral k, $T_{b,l}^{(max)}$ may be the maturity concentration limit defined between b and l, and $I^{(M)}(k, d)$ may be an indicator function that defines deals and collaterals participation. In an embodiment $$I^{(M)}(k, d) = \begin{cases} 1 & \text{if } k \text{ and } d \text{ participate in the weighted maturity concentration limit constraint.} \\ 0 & \text{otherwise} \end{cases}$$

For a weighted average of credit rating: $\in_{d \in D_b} \Sigma_{k \in K} \pi_k P_k(d) I^{(C)}(k, d)$, where $R_k$ is the credit rating of the collateral k, $R_{b,l}^{(max)}$ is the credit rating limit between b and l, and $I^{(C)}(k, d)$ is an indicator function that defines deals and collaterals participation. For example $$I^{(C)}(k, d) = \begin{cases} 1 & \text{if } k \text{ and } d \text{ participate in the weighted credit rating concentration limit constraint.} \\ 0 & \text{otherwise} \end{cases}$$

Another constraint may be implemented on a maximal number of positions: $\in_{d \in D_{b,l}} \Sigma_{k \in K} \theta(P_k(d)) \le N_{b,l}^{(max)}$, where $N_{b,l}^{(max)}$ is the number of positions limit between b and l.

While implementing one or more of these constraints, objective functions of the end state optimization may be performed. As shown, in some embodiments the optimization may include optimizing various values (for example, by minimizing them).

To minimize amount short: $\Sigma_{d \in D_b} [V(d) - A(d) \cdot \theta(V(d) - A(d))]$.

To minimize collateralization index:

$$\frac{1}{V_b} \sum_{d_{b,l} \in D_b} \sum_{k \in K} \pi_k P_k(d_{b,l}),$$

where $V_b$ is the total loan amount of borrower b. When all deals of a borrower are fully collateralized (i.e., the amount short that may be minimized above is zero), the collateralization index measures how efficient the collaterals are used to cover the loans. It may be appreciated that $V_b$ may be a constant during optimization, and its inclusion above would not affect optimization.

To minimize cost of carry index:

$$\frac{1}{V_b} \sum_{d_{b,l} \in D_b} \sum_{k \in K} \frac{\pi_k P_k(d_{b,l}) \Gamma_{k,b,l}}{M_{k,b,l}},$$

where $V_b$ is the total loan amount and $\Gamma_{k,b,l}$ is the cost of carry for collateral k for borrower b, $M_{k,b,l}$ is the margin factor between borrower b and lender l for collateral k. It may be appreciated that cost of carry may represent the preference of a borrower on allocation of collaterals. Minimization of the cost of carry index may provide a mechanism for a borrower to influence allocation of collaterals based on the preference. Under reasonable assumptions, it may be shown that there exists a set of cost of carry $\{\Gamma_{k,b,l}, k \in K\}$ that can drive collateral allocation to any given preference of a borrower. Again, $V_b$ may be a constant during optimization, and its inclusion above would not affect optimization.

To minimize upgraded amount:

$$\sum_{d_{b,l} \in D_b} \sum_{k \in K} \frac{\pi_k P_k(d_{b,l} I_k^{(U)}(d_{b,l}))}{M_{k,b,l}},$$

where $I_k^{(U)}(d_{b,l})$ may be the upgrade indicator function for collateral k in deal $d_{b,l}$, and $M_{k,b,l}$ is the margin factor between borrower b and lender l for collateral k.

To minimize auto cash: $\Sigma_{d \in D_b} C(d) \cdot \theta[C(d)]$, where $C(d)=C^{(0)}(d)+A^{(0)}(d)-A(d)$, which may be determined by requiring the collateral maintenance level of the end state to be equal to that of the initial state, $C^{(0)}(d)$ and $A^{(0)}(d)$ may be the auto cash and allocation of deal d before the optimization.

To minimize short priority: $\Sigma_{d \in D_b} \Pi_D \cdot \theta(V(d)-A(d))$, where $\Pi_d$ may be a predefined priority of deal d.

To minimize position movement: $\Sigma_{d \in D_b} I^{(PM)} d \Sigma_{k \in K} [1-\delta_{P_k(d),P_k^{(0)}(d)}]$, where $I^{(PM)}(d)$ may be the indicator function for the set of deals for which position movement is to be minimized, $P_k^{(0)}(d)$ may be the par amount of the collateral k for deal d before the optimization, and may be the Kronecker δ-function:

$$\delta_{i,j} = \begin{cases} 1 & i=j \\ 0 & i \neq j \end{cases}.$$

To minimize allocation of DTC collaterals to maturing deals:

$$\sum_{d_{b,l} \in D_b} I^{(M)} d_{b,l} \sum_{k \in K} \frac{\pi_k P_k(d_{b,l}) I_k^{(DTC)}(k)}{M_{k,b,l}},$$

where $I^{(M)}(d)$ may be the maturing deal indicator function and $I^{(DTC)}(k)$ may be the DTC collateral indicator function.

As indicated above, transition state optimization may be performed in some embodiments. Transition state optimization may seek to determine a set of intermediate states that facilitate transition to the optimal collateral allocation configuration for a given borrower b. Specifically, it may determine a set $\{S_i, i=0, 1, \cdots, N\}$, of which the elements may be defined by: $S_i=(\{C_b^{(i)}(d), d \in D_b\}, \{P_{k,b}^{(i,f)}, k \in K\}, \{P_k^{(i)}(d), k \in K \text{ and } d \in D_b\})$, where $S_0$ may be the initial state and $S_N$ may be the optimal end state of the borrower. $S_0$ and $S_N$ may be given by: $S_0=(\{C_b^{(0)}(d), d \in D_b\}, \{P_{k,b}^{(0,f)}, k \in K\}, \{P_k^{(0)}(d), k \in K \text{ and } d \in D_b\})$, and $S_N=(\{C_b(d), d \in D_b\}, \{P_{k,b}^{(f)}, k \in K\}, \{P_k(d), k \in K \text{ and } d \in D_b\})$, where $C_b(d)$, and $P_k(d)$ may be respectively the minimal auto cash amount, and the optimal collateral allocation, as described above and determined by end state optimization. The free (or unallocated) par amount $P_k^{(i,f)}$ may be given by $P_k^{(i,f)}=P_{k,b}-\Sigma_{d \in D_b} P_k^{(i)}(d)$. In an embodiment transition state optimization may be specific to a given borrower. As such, the borrower label b may be omitted when described herein if its implied usage is contextually understood.

In an embodiment, it may be appreciated that constraints associated with transition state optimization may be applied. In some embodiments, the constraints for end state optimization, as described above, might need to be satisfied by the intermediate states, because the intermediate states may be viewed potentially (under certain market conditions) as valid states for a borrower per given repo business applications.

As a constraint where auto cash cannot exceed defined limits: $\Sigma_{d \in D_b} C_b^{(i)}(d) \leq C_b^{(max)}$ for $i=1, 2, \ldots, N-1$, where $C_b^{(max)}$ may be a maximal amount of auto cash allowed for borrower b.

As a constraint where collateral maintenance levels may not decrease for moves between the intermediate states: $C_b^{(i+1)}(D)+A^{(i+1)}(d) \geq C_b^{(i)}(d)+A^{(i)}(d)$ for $i=0, 1, 2, \ldots, N-1$ and $d \in D_b$, where $A^{(i)}(d)$ may be the margin adjusted value (e.g., in USD) of the collaterals allocated to deal d in the state $S_i$. The constraints may collectively imply that the collateral maintenance level of any intermediate state might not exceed that of the end state, which is determined by end state optimization.

To constrain a number of data changes in a system transaction to not exceed defined limits: $N_{S_i,S_{i+1}} \leq N^{(max)}$ for $i=0, 1, 2, \ldots, N-1$, where $N_{S_i,S_{i+1}}$, may be the number of data changes to move from state $S_i$ to state $S_{i+1}$ and N may be the maximal number of data changes allowed in a system transaction. It may be appreciated that in some embodiments such a constraint might not a hard constraint, as indicated by the above equation. Instead, it merely expresses the desire to restrict $N_{S_i,S_{i+1}}$, around $N^{(max)}$, and can be implemented as a minimization of a penalty function, as described below.

With such constraints in mind, it may be appreciated that objective functions of the transition state optimization may be implemented. As shown, in some embodiments the optimization may include optimizing various values (for example, by minimizing them).

To minimize auto cash for all intermediate states: $\Sigma_{d \in D_b} C_b^{(i)}(d)$ for $i=1, 2, \ldots, N-1$.

To minimize data change penalty for moves between the intermediate states: $U(N_{S_i,S_{i+1}})$ for $i=1, 2, \ldots, N-1$, where the penalty function U(N) should be continuous, reaches its minimal at $N^{(max)}$, and penalizes deviation from $N^{(max)}$, especially when N exceeds $N^{(max)}$. Though the exact functional form of a reasonable U(N) might be determined through experimentation, in some embodiments the U(N) described below may be applicable, in which:

$$U(N) = \begin{cases} U^{(-)} \cdot (N^{(max)} - N) & N \leq N^{(max)} \\ U^{(+)} \cdot (e^{\beta(N-N^{(max)})} - 1) & N > N^{(max)} \end{cases},$$

where $U^{(-)}$, $U^{(+)}$, $\beta>0$ are parameters of the penalty function. It may be appreciated that this specific form of U(N) respectively penalizes deviations below and above $N^{(max)}$ linearly and exponentially.

As noted above, in some embodiments the objective optimizations may be implemented one at a time, with the optimal value being utilized to recode the objective as a constraint while the model is re-run for a subsequent objective. The order in which the objectives are run may vary across embodiments. In one non-limiting embodiment, the auto cash may be minimized, before the amount short may be minimized, before the cost to carry index may be minimized, before the collateralization index may be minimized. In some embodiments, the ordering of the objectives may be configured independently for each dealer. In some embodiments, the ordering of objectives may be configured independently for each run of the optimization.

According to some embodiments, collateral optimizations may be implemented associated with Delivery Verses Payment (DVP) and/or Receipt Verses Payment (RVP) models for securities trades in repurchase agreements (e.g., "DRVP models"). For example, features of such models may be found in U.S. Provisional Patent Application Ser. No.

61/647,346, incorporated by reference in its entirety above. Such optimization may again include: (1) determining the optimal collateral allocation configuration, which may be known as an end state optimization, and (2) generate and execute instructions to realize allocation changes for transitioning to the optimal allocation configuration from an existing one. A transition to the end state may be executed as multiple individual transactions involving a number of intermediate configurations that satisfy the appropriate constraints. Determining the intermediate configurations may give rise to transition state optimization.

As with the embodiment described above, the end state optimization and the transition state optimizations described in greater detail below may make use of various conventions. Since optimization of collateral allocation may be done in the context of a given borrower, a simplified notation may be utilized to focus on the given borrower. Preference of lenders may be identified through various defined parameters. In the context of daily operation of tri-party repurchase agreement, many of the parameters and variables vary over time (e.g., during a business day). To describe the time dependent nature of the problem, t may be understood as representing time, and the parameters and variables may be a function of t when appropriate. As such, $K_t$ represents the set of collaterals owned by the borrower at time t, while $D_t$ represents the set of deals of the borrower at time t.

The value $v_d$ represents the priority of a deal d in collateral allocation. In particular, it may express an aspect of a borrower's desire of how collaterals should be allocated across the deals. In some embodiments, such as those described herein, $v_d$ may have a fixed value throughout a given business day. Accordingly, the time dependence of $v_d$ has been dropped.

$P_{k,b}(t)$ represents the par amount of a collateral k allocated to the deal d at time t.

$V_d(t)$ represents the value (e.g., in USD) of the loan amount of a deal d at time t. It may be appreciated that $V(t)=\Sigma_{d \in D_t}V_d(t)$, and may represent the total loan amount of the borrower.

$\tilde{V}_d(t)$ represents the settled amount for deal d at time t, and may include the cash amount already transferred from a lender to a borrower for the deal.

$\overline{C}_d(t)$ represents the amount of tri-party cash from a lender made available for the settlement of a deal d.

$C_d(t)$ represents the amount of tri-party cash used for settlement of a deal d, and is a decision variable of the optimization.

$A_d(t)$ represents the margin adjusted value (e.g., in USD) of the collaterals allocated to a deal d. It may be defined that $$A_d(t) = \sum_{k \in K_t} \frac{\pi_k}{\mu_{k,d}} \cdot P_{k,d}(t),$$

where $\mu_{k,d}$ is the margin factor of collateral k for deal d. Because $\pi_k$ and $\mu_{k,d}$ may both be assumed to be fixed for a given business day (as is custom in current tri-party repurchase practice), their time dependence has been dropped.

$P_k(t)$ represents the par amount of collateral k owned by the borrower at time t.

$P_k^{(f)}(t)$ represents the par amount of free (i.e., unallocated) of collateral k owned by the borrower.

It may be appreciated that objective functions referring to maturing deals and collaterals that are DTC/DTCC securities may make use of the indicator functions defined above. To reiterate, the indicator functions may be defined where:

The Maturing deal indicator function:

$$I^{(M)}(d) = \begin{cases} 1 & \text{if } d \text{ is a maturing deal, i.e.,} \\ & \text{its experation date is the current or earlier date} \\ 0 & \text{otherwise} \end{cases}$$

The DTC collateral indicator function:

$$I^{(DTC)}(K) = \begin{cases} 1 & \text{if } k \text{ is a DTCC collateral} \\ 0 & \text{otherwise} \end{cases}.$$

$\tilde{C}_d(t)$ represents the auto cash extended to deal d.
$\tilde{C}^{(max)}(t)$ represents the maximal amount of auto cash available to the borrower. In some embodiments (e.g., according to current tri-party practices), the available amount of auto cash may be determined by a number of factors, including but not limited to the borrower's net free equity held by the third party.

$M_d(t) \triangleq \min (V_d(t), \tilde{C}_d(t)A_d(t))$ represents the collateral maintenance level of deal d. When a deal is not fully collateralized, it may be appreciated that its collateral maintenance level may be the sum of the margin adjusted value (e.g., in USD) of the allocated collaterals and any auto cash extended to the deal.

The tuple $\Psi(t)=(V_d(t),\tilde{V}_d(t),P_k(t),\overline{C}_d(t),\tilde{C}^{(max)}(t), P_{k,d}(t), C_d(t),\tilde{C}_d(t))$, where $k \in K_t$, and $d \in D_t$, represents the state of the borrower at time t, and may provide generally complete information about the borrower from tri-party repurchase agreement perspectives. In an embodiment, the first five components of the tuple may represent exogenous variables that may be determined by tri-party repurchase agreement business events such as (but not limited to) collateral release, substitution, creation and settlement of new and changed deals, and so on. The last three components may be endogenous or decision variables determined by optimization. Both end state and transition state optimization may be formulated based on T(t).

The embodiments described below may again utilize the step function $\theta(x)$, where $$\theta(x) = \begin{cases} 1 & \text{if } x > 0 \\ 0 & \text{if } x \leq 0 \end{cases}.$$

It may be appreciated that given the state $\Psi(t)$ of the borrower at time t and the exogenous variables at time t', the end state optimization may seek to determine the decision variables of $\Psi(t')$ for a given t'>t. The end state optimization may be implemented subject to the following constraints, in which:

The allocated amount may be constrained to be a non-negative integer: $P_{k,d}(t) \in N_0$.

The allocated par amount may be constrained to not be greater than what a borrower owns: $\Sigma_{d \in D_t} P_{k,d}(t) \leq P_k(t)$.

The allocated par amount may be constrained to be greater than a threshold if allocated: $P_k(t) \in \{0\} \cup [\max(P_{k,d}^{(min)},P_k^{(min)}),+\infty])$, where $P_{k,d}^{(min)}$ is the minimal par piece size of deal d for collateral k, and $P_k^{(min)}$ is the minimal par size for the collateral k.

The collateral maintenance level may be constrained such that it cannot decrease: $M_d(t') \geq M_d(t)$ for t'>t, for any $d \in D_t \cap D_{t'}$.

There may be a constraint on the maximal auto cash: $\Sigma_{d \in D_t} \tilde{C}_d(t) \leq \tilde{C}^{(max)}(t)$.

There may be constraints on DVP, where $A_d(t)+C_d(t)+\tilde{C}_d(t) \geq \overline{C}_d(t)+\tilde{V}_d(t)$ and $C_d(t) \leq \min(V_d-\tilde{V}_d, \overline{C}_d(t))$ for new and non-maturing deals with an increased loan amount. It may be appreciated that these constraints might be applied specifically when optimizing the settlement index described in greater detail below.

A general concentration limit may be applied: $\Sigma_{d \in D_t} \Sigma_{k \in K_t} C_{k,d}^{(\alpha)} \leq \overline{C}^{(\alpha)}$, where $\alpha$ identifies a specific rule that gives rise to the concentration limit constraint, $C_{k,d}^{(\alpha)}$ is a concentration function for collateral k and deal d, and $\overline{C}^{(\alpha)}$ is the concentration limit.

Examples of various concentration limit constraints may also be appreciated. For example, a currency concentration (e.g., in USD): $\Sigma_{d \in D_t} \Sigma_{k \in K_t} I_{k,d}^{(\alpha,USD)} \pi_k P_{k,d}(t) \leq \overline{V}^{(\alpha,USD)}$, where $\overline{V}^{(\alpha,USD)}$ is the currency concentration limit (in USD), $\alpha$ labels a specific constraint, and $I_{k,d}^{(\alpha,USD)}$ is an indicator function that defines deal and collateral participation. For example, $$I_{k,d}^{(\alpha,USD)} = \begin{cases} 1 & \text{if } k \text{ and } d \text{ participate in constriant } \alpha \\ 0 & \text{otherwise} \end{cases}.$$

It may be appreciated that the currency constraint may use a collateral value that is not margin adjusted. In some implementations, margin adjusted values arguably should be used, such as in the extreme case of large margin factor limits. In this extreme case, however, the collaterals with very large margin factor will not be financially relevant. Therefore it may be omitted from the concentration limit constraints, contrary to what the above constraint illustrates.

As an example of a maximal par concentration limit: $\Sigma_{d \in D_t} \Sigma_{k \in K_t} I_{k,d}^{(\alpha,MP)} P_{k,d}(t) \leq \overline{P}^{(\alpha,MP)}$, where $\overline{P}^{(\alpha,MP)}$ is the par concentration limit, $\alpha$ labels a specific constraint, and $I_{k,d}^{(\alpha,MP)}$ is an indicator function that defines deal and collateral participation. Specifically, the indicator function $$I_{k,d}^{(\alpha,MP)} = \begin{cases} 1 & \text{if } k \text{ and } d \text{ participate in constriant } \alpha \\ 0 & \text{otherwise} \end{cases}.$$

As an example of the weighted average of maturity: $\Sigma_{d \in D_t} \Sigma_{k \in K_t} I_{k,d}^{(\alpha,M)} T_k \pi_k P_{k,d}(t) \leq \overline{T}^{(\alpha,M)} \cdot \Sigma_{d \in D_t} \Sigma_{k \in K_t} I_{k,d}^{(\alpha,M)} \pi_k P_{k,d}(t)$, where $T_k$ is the months to maturity for the collateral k, $\overline{T}^{(\alpha,M)}$ is the maturity concentration limit, $\alpha$ labels a specific constraint, and $I_{k,d}^{(\alpha,M)}$ is an indicator function that defines deal and collateral participation. Specifically, the indicator function $$I_{k,d}^{(\alpha,M)} = \begin{cases} 1 & \text{if } k \text{ and } d \text{ participate in constraint } \alpha \\ 0 & \text{otherwise} \end{cases}.$$

As an example of the weighed averaged of credit rating: $\Sigma_{d \in D_t} \Sigma_{k \in K_t} I_{k,d}^{(\alpha,C)} R_k \pi_k P_{k,d}(t) \leq \overline{R}^{(\alpha)} \cdot \Sigma_{d \in D_t} \Sigma_{k \in K_t} I_{k,d}^{(\alpha,C)} \pi_k P_{k,d}(t)$, where $R_k$ is the credit rating of the collateral k, $\overline{R}^{(\alpha)}$ is the credit rating limit, $\alpha$ labels a specific constraint, and $I_{k,d}^{(\alpha,C)}$ is an indicator function that defines deal and collateral participation. Specifically, the indicator function $$I_{k,d}^{(\alpha,C)} = \begin{cases} 1 & \text{if } k \text{ and } d \text{ participate in constraint } \alpha \\ 0 & \text{otherwise} \end{cases}.$$

As an example constraint on a maximal number of positions: $\Sigma_{d \in D_t} \Sigma_{k \in K_t} \theta(P_{k,d}(t)) \leq \overline{N}$, where $\overline{N}$ is the maximal number of positions allowed.

While implementing one or more of these constraints, objective functions of the end state optimization may be performed. As shown, in some embodiments the optimization may include optimizing various values (for example, by minimizing them).

To minimize settlement index: $\Sigma_{d \in D_t} \Sigma_{k \in K_t} \pi_k P_{k,d}(t) + (\Xi^{(S)} + v_d) S_d(t) + \Xi^{(T)} [\overline{C}_d(t) - C_d(t)] \Xi^{(A)} \tilde{C}_d(t) + \Delta^{(A)} I_d^{(E)} E_d(t)$, where the allocation shortage $S_d(t) = [V_d(t) - A_d(t)] \cdot \theta(V_d(t) - A_d(t)])$, and auto cash excess $E_d(t) = [\tilde{C}_d(t) + V_d(t) - \tilde{V}_d(t)] \cdot \theta(\tilde{C}_d(t) + V_d(t) - \tilde{V}_d(t)) \cdot I_d^{(E)}$ is an indicator function of non-maturing deals with decreased loan amount. Specifically, $$I_d^{(E)} = \begin{cases} 1 & \text{if } d \text{ is non-maturing and } \tilde{V}_d(t) > V_d(t) \\ 0 & \text{otherwise} \end{cases}.$$

$\Xi^{(S)}, \Xi^{(T)}, \Xi^{(A)},$ and $\Delta^{(A)}$ are respectively penalty factors for allocation shortage, under usage of tri-party cash, usage of auto cash, and excess of auto cash against decreased loan amount. In an embodiment, proper behavior of the objective function in the large margin factor limit may require the penalty factors to be proportional to the maximal margin. For example, $\Xi^{(S)} = \xi^{(S)} \cdot \mu^{(max)}$, $\Xi^{(T)} = \xi^{(T)} \cdot \mu^{(max)}$, $\Xi^{(A)} = \xi^{(A)} \cdot \mu^{(max)}$, and $\Delta^{(A)} = \delta^{(A)} \cdot \mu^{(max)}$, where $$\mu^{(max)} = \max_{k \in K_t, d \in D_t} \mu_{k,d}$$

is the maximal margin for the collaterals involved in the deals of borrower b. The actual value of the coefficients may be determined via experimentation. In an embodiment where it is given that $\mu^{(max)} \sim 1$ for all borrowers in all existing repurchase agreement deals, the value of the penalty factors may initially be: $\xi^{(S)} = 2$, $\xi^{(T)} = 5$, $\xi^{(A)} = 4$, and $\Delta^{(A)} = 2$.

To minimize the collateralization index and the cost of carry index, it may be appreciated that the collateralization index may be defined as:

$$\frac{1}{V_d(t)} \sum_{d \in D_t} \sum_{k \in K_t} \pi_k P_{k,d}(t),$$

where V(t) is the total loan amount of the borrower at time t. Since V(t) is exogenous variable, its inclusion in the above equation would not affect optimization. It may additionally be appreciated that the cost of carry index may be defined as:

$$\sum_{d \in D_t} \frac{1}{V_d(t) - S_d(t)} \sum_{k \in K_t} \frac{\pi_k P_{k,d}(t) \Gamma_{k,d}}{\mu_{k,d}},$$

where $S_d(t)$ is allocation shortage determined as an outcome of optimizing the settlement index. $\Gamma_{k,d}$ is the cost of carry for collateral k for deal d, and $\mu_{k,d}$ is the margin factor for collateral k in deal d.

It may be appreciated that these two objectives conflict with each other. As such, from tri-party repurchase agreement optimization perspectives, it may be more appropriate to define optimality in a Pareto or pseudo Pareto fashion.

As noted above, transition state optimization may be performed. Again, transition state optimization may seek to determine a set of intermediate states that facilitate transition to the optimal collateral allocation configuration. Specifically, in this embodiment it may determine a set $\{\Psi^{(i)}, i=0, 1, \cdots, N\}$ where $\Psi^{(0)}$ is the state of the borrower at time t before end state optimization and $\Psi^{(N)}$ is the optimal state determined by the end state optimization.

Similar to the embodiments above, it may be appreciated that constraints associated with transition state optimization may be applied. In some embodiments, the constraints for end state optimization, as described above, might need to be satisfied by the intermediate states, because the intermediate states may be viewed potentially (under certain market conditions) as valid states for a borrower per given repo business applications.

A constraint may be applied that collateral maintenance levels cannot decrease for moves between the intermediate states. In particular, $M_d^{(i+1)}(t) \geq M_d^{(i)}(t)$ for $i=1, 2, \ldots, N-1$ and $d \in D_r$. It may be appreciated that the constraints collectively imply that the collateral maintenance level of any intermediate state might not exceed that of the end state.

Another constraint that might be applied that a number of data changes in a system transaction should not exceed defined limits. In particular, $N_{\Psi^{(i)},\Psi^{(i+1)}} \leq N^{(max)}$ for $i=1, 2, \ldots, N-1$, where $N_{\Psi^{(i)},\Psi^{(i+1)}}$ is the number of data changes to move from state $\Psi^{(i)}$ to state $\Psi^{(i+1)}$ and $N^{(max)}$ is the maximal number of data changes allowed in a system transaction. It may be appreciated that this constraint is not necessarily a hard constraint, as indicated by the equation above, but instead merely expresses the desire to restrict, $N_{\Psi^{(i)},\Psi^{(i+1)}}$ around $N^{(max)}$. The constraint may be implemented as minimization of a penalty function, as described in greater detail below.

With such constraints in mind, it may be appreciated that objective functions of the transition state optimization may be implemented. As shown, in some embodiments the optimization may include optimizing various values (for example, by minimizing them).

To minimize auto cash for all intermediate states: $\Sigma_{d \in D_r} \tilde{C}_d^{(i)}(t)$ for $i=1, 2, \ldots, N-1$.

To minimize data change penalty for moves between the intermediate states: $U(N_{\Psi^{(i)},\Psi^{(i+1)}})$ for $i=0, 1, 2, \cdots, N-1$, where the penalty function U(N) should be continuous, reaches its minimal at $N^{(max)}$, and penalizes deviation from $N^{(max)}$, especially when N exceeds $N^{(max)}$. As noted above, though the exact functional form of a reasonable U(N) may be determined through experimentation the definition $$U(N) = \begin{cases} U^{(-)} \cdot (N^{(max)} - N) & N \leq N^{(max)} \\ U^{(+)} \cdot (e^{\beta(N - N^{(max)})} - 1) & N > N^{(max)} \end{cases},$$

where $U^{(-)}$, $U^{(+)}$, $\beta > 0$ are parameters of the penalty function, may be applicable. Again, this specific form of U(N) respectively penalizes deviations below and above $N^{(max)}$ linearly and exponentially.

It may be appreciated that various constraints and objectives may be implemented in various embodiments. In one non-limiting embodiment, the settlement index may be minimized to determine the minimal collateralization level of each deal. After doing so, the collateralization level may be re-encoded as a constraint, and the collateralization index and cost of carry index may be minimized, as described above. Minimizing the collateralization index and the cost of carry index may be utilized to determine which collateral to allocate to the deal. In an embodiment, a Pareto curve may be built between minimizing the collateralization index and minimizing the cost to carry index. In an embodiment, a user may choose a desired position on the Pareto curve, and the optimization may be modified accordingly.

Although implementing the optimization models described above may vary across embodiments, in an embodiment one or more the models may be implemented through a greedy algorithm that makes a logically optimal choice at each stage of analysis. FIG. 11 illustrates an embodiment of a workflow 400 configured to implement such a greedy algorithm. As shown, in an embodiment workflow 400 may begin at 410 by receiving a message from a message queue, which may include various instructions associated with implementing the workflow 400. Workflow 400 may then continue at 420 by loading data. In some embodiments, loading data at 420 may be similar to loading data at 210 from process 200. As shown in FIG. 11, in an embodiment the data may be retrieved from database(s) 430. The database(s) 430 may be stored on one or more storage mediums, and in some embodiments may be analogous to or comprise the databases 160 of collateral management system 140. In some embodiments, the data may be retrieved from a plurality of databases, which may be spread across one or more storage mediums. In the illustrated embodiments, the data loaded at 420 include data from a security master database 440, rule sets 450, source mode deals 460, source mode positions 470, target mode deals 480, and target mode positions 490.

Having loaded data at 420, workflow 400 may continue at 500 by placing an allocation lock on dealer boxes, repo accounts and concentration limits. It may be appreciated that locking the dealer boxes, repo accounts, and concentration limits may be locked for the duration of the allocation, to ensure that another allocation or unwind processes does not access the same resources in parallel with another allocation running at the same time (which might otherwise result in double allocation of resources).

Workflow 400 may then determine position eligibility at 510. As shown, in the illustrated embodiment determining position eligibility at 510 may include running a gross eligibility analysis at 520, before updating margins at 530. Running the gross eligibility analysis at 520 may in some embodiments be similar to initializing the data at 215 in process 200, while updating the margins at 530 may in some embodiments be similar to refreshing the margins at 230 of process 200. The updated margins from 530 may be fed back into the target mode positions 490 stored in the database(s) 430. Position eligibility determinations at 510 may then continue at 540 by updating group concentrations. As shown, the group concentrations may be stored in target mode group concentration buckets 550 in the database(s) 430. Determining position eligibility at 510 may then continue at 560 by initializing concentration buckets at 560, making use of the target mode positions 490 and the target mode group concentration buckets 550. In some embodiments, updating the group concentrations at 540 and initializing the concentration buckets at 560 may comprise or otherwise be similar to populating the concentration linked list at 235 of process 200. Likewise, it may be appreciated that position eligibility determination at 510 may vary across embodiments, and those features described herein are merely exemplary. For example, in some embodiments one or more features of testing position eligibility may be as disclosed in U.S. patent application Ser. No. 13/368,952, incorporated in its entirety herein by reference.

Workflow 400 may then proceed at 570 by allocating collateral, and optimizing the allocations utilizing math models described above. In an embodiment, positions may initially be assigned within four structures: par_db (how much of each position is not allocated in memory), par_repo (how much of each position is allocated to each deal in memory), par_db_optimized (how much of each position is not allocated in the optimized state), and par_repo_optimized (how much of each position is allocated to each deal in the optimized state). These structure names are merely exemplary, and may vary across embodiments. In an embodiment, a begin transaction instruction may be generated initially, which may be executed later in the database. As shown, the allocation at 570 may begin at 580 by allocating available collateral. In an embodiment, for each position where par_db>0 and par_repo_optimized>par_repo, the allocation at 580 may comprise allocating the position in memory if it is not breaking a concentration limit. An associated instruction may also be generated during the allocation at 580. While the allocation may complete if it is then determined at 590 that all instructions have been generated, if more work is required then the allocation at 570 may proceed at 600 by substituting excess collateral. In an embodiment, the determination at 590 may include generating a commit transaction instruction. If par_repo does not equal the par_repo_optimized structure, then the allocation at 570 may end. Otherwise, a begin transaction instruction may be created for future execution. When substituting excess collateral at 600, for each position where par_repo>par_repo_optimized, the collateral may be removed up to (par_repo−par_repo_optimized), while keeping the deal fully collateralized. In an embodiment, for each position moved, a substitution instruction may be generated. In an embodiment, it may be acceptable to move positions to a tolerated level above (par_repo−par_repo_optimized), which may facilitate simpler transactions, and may result in fewer substitution instructions being generated.

If at 610 it is determined that no instructions were generated in the previous step, then the allocation at 570 may proceed at 620 by substituting to maximize cash exposure. In an embodiment, substituting excess collateral at 600 may break to 610 if more than a pre-determined number of instructions are generated, which may keep the transaction size manageable. In an embodiment, substituting to maximum cash exposure at 620 may comprise, for each position where par_repo>par_repo_optimized, removing collateral up to (par_repo−par_repo_optimized), while keeping the maximum cash exposure below a pre-defined limit. In an embodiment, for each position moved, a substitution instruction may be generated. If not all cash exposure is determined to have been maximized at 630, and some collateral remains, then allocation at 570 may proceed at 640 by substituting any remaining collateral. In an embodiment, substituting to maximum cash exposure at 620 may break to 630 if more than a pre-determined number of instructions are generated, which may keep the transaction size manageable. In an embodiment, substituting remaining collateral at 640 may comprise, for each position where par_repo>par_repo_optimized, removing collateral up to (par_repo−par_repo_optimized). For each position moved, a substitution instruction may be generated. In an embodiment, if more than a pre-determined number of instructions are generated, the allocation at 570 may break to 590 to keep the transaction size manageable. If cash exposure has been determined to have been maximized at 630 or once remaining collateral has been substituted at 640, allocation at 570 may return to 580, with allocation of available collateral. In an embodiment, if instructions were generated at 610 or 640, the allocation at 570 may return to 590, determining if all instructions are generated. If, at this point, all allocation instructions have been generated at 590, then allocation may terminate. Otherwise, if more work is still required, then excess collateral may again be substituted at 600. If it is determined at 610 that instruction were created in the previous step, then allocation at 570 may return to allocating available collateral at 580 without again substituting to maximize cash exposure at 620 (and potentially substituting any remaining collateral at 640).

FIG. 12 shows an illustrative system for implementing machine learning in a universal deep linking system, in accordance with one or more embodiments. As shown in FIG. 12, system 1200 may include user device 1222, user device 1224, and/or other components. Each user device may include any type of mobile terminal, fixed terminal, or other device. For example, each of these devices may comprise one or more of the devices shown above. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data.

By way of example, user device 1222 and user device 1224 may include a desktop computer, a server, or other client device. Users may, for instance, utilize one or more of the user devices to interact with one another, one or more servers, or other components of system 1200. It should be noted that, while one or more operations are described herein as being performed by particular components of system 1200, those operations may, in some embodiments, be performed by other components of system 1200. As an example, while one or more operations are described herein as being performed by components of user device 1222, those operations may, in some embodiments, be performed by components of user device 1224. System 1200 also includes machine learning model 1202, which may be implemented on user device 1222 and user device 1224, or accessible by communication paths 1228 and 1230, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 12 also includes communication paths 1228, 1230, and 1232. Communication paths 1228, 1230, and 1232 may include the Internet, a mobile phone network, a mobile voice or data network (e.g., a 4G or LTE network), a cable network, a public switched telephone network, or other types of communications network or combinations of communications networks. Communication paths 1228, 1230, and 1232 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 12, machine learning model 1202 may take inputs 1204 and provide outputs 1206. The inputs may include multiple data sets such as a training data set and a test data set. In some embodiments, outputs 1206 may be fed back to machine learning model 1202 as input to train machine learning model 1202 (e.g., alone or in conjunction with user indications of the accuracy of outputs 1206, labels associated with the inputs, or with other reference feedback information). In another embodiment, machine learning model 1202 may update its configurations (e.g., weights, biases, or other parameters) based on the assessment of its prediction (e.g., outputs 1206) and reference feedback information (e.g., user indication of accuracy, reference labels, or other information). In another embodiment, where machine learning model 1202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 1202 may be trained to generate better predictions.

In some embodiments, machine learning model 1202 is trained using unsupervised learning to produce a low-dimensional (e.g., two-dimensional), discretized representation of the input space of the training samples, called a map. By reducing dimensions, model 1202 may increase the speed at which data (e.g., collateral allocations) is processed. Self organizing maps created by model 1202 differ from other artificial neural networks as they apply competitive learning as opposed to error-correction learning (such as backpropagation with gradient descent).

In some embodiments, machine learning model 1202 may include an artificial neural network. In such embodiments, machine learning model 1202 may include input layer and one or more hidden layers. Each neural unit of machine learning model 1202 may be connected with many other neural units of machine learning model 1202. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 1202 may be self-learning and trained, rather than explicitly programmed, and can perform significantly better in certain areas of problem solving, as compared to traditional computer programs. During training, an output layer of machine learning model 1202 may correspond to a classification of machine learning model 1202 and an input known to correspond to that classification may be input into an input layer of machine learning model 1202 during training. During testing, an input without a known classification may be input into the input layer, and a determined classification may be output.

In some embodiments, machine learning model 1202 may include multiple layers (e.g., where a signal path traverses from front layers to back layers). In some embodiments, back propagation techniques may be utilized by machine learning model 1202 where forward stimulation is used to reset weights on the "front" neural units. In some embodiments, stimulation and inhibition for machine learning model 1202 may be more free-flowing, with connections interacting in a more chaotic and complex fashion. During testing, an output layer of machine learning model 1202 may indicate whether or not a given input corresponds to a classification of machine learning model 1202). Machine learning model 1202 may be used by a feature registry to respond to a feature registry request and/or power a feature that is generated for display.

The above-discussed embodiments and aspects of this disclosure are not intended to be limiting, but have been shown and described for the purposes of illustrating the functional and structural principles of the inventive concept, and are intended to encompass various modifications that would be within the spirit and scope of the following claims.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A system for optimizing data processing in machine learning environments using self organizing maps, the system comprising:
one or more cloud-based memory elements coupled to a computer system and configured to at least store deal attributes including collateral allocation rulesets associated with a first device, and collateral characteristics for collateral provided by a second device that are associated with one or more records;
a machine learning model implemented on the computer system that is trained based on portfolio deal attributes including the collateral allocation rulesets associated with a training portfolio to produce a self organizing map, wherein:
the machine learning model is trained, by generating outputs based on inputs of the training portfolio and updating configurations of the machine learning model based on assessments of predictions in the outputs, to generate the self organizing map for collateral allocation; and
the self organizing map comprises a neural network that uses vectors of margins for individual positions as inputs to train the neural network in a learning mode, wherein the learning mode comprises use of competitive learning by the neural network in which nodes of the neural network compete for a right to respond to a subset of the inputs such that the nodes learn to specialize on ensembles of similar patterns and are configured as feature detectors for different classes of input patterns, and wherein the neural network classifies a new input vector using a mapping mode; and
the computer system comprising one or more physical processors programmed by computer program instructions that, when executed, cause the computer system to:
recall collateral originally associated with the one or more records into a common dealer box; and
identify under-collateralized ones of the one or more records.

2. The system of claim 1, the computer system comprising one or more physical processors programmed by computer program instructions that, when executed, further cause the computer system to:
identify, using the self organizing map and one or more of the collateral allocation rulesets and the collateral characteristics, groups of recalled collateral; and
sort said groups of recalled collateral such that smaller average margins are given a higher priority while larger average margins are given a lower priority.

3. The system of claim 2, the computer system comprising one or more physical processors programmed by computer program instructions that, when executed, further cause the computer system to:
determine messaging passing nodes available for performing collateral allocation for the one or more records; and
assign the groups of recalled collateral from the common dealer box to a message passing nodes such that one of the message passing nodes is assigned to each of the one or more records in order from the higher priority to the lower priority to allocate collateral to the one or more records.

4. The system of claim 3, the computer system comprising one or more physical processors programmed by computer program instructions that, when executed, further cause the computer system to:
provide the collateral allocation rulesets to the message passing nodes to cause each of the message passing nodes to allocate collateral to its respective record in accordance with the collateral allocation rulesets, performances of collateral allocations by each of the message passing nodes comprising the message passing node performing collateral allocation with respect to the message passing node's records.

5. The system of claim 1, wherein the computer system is further programmed to receive a priority ranking for a basket schedule, a market deadline, an internal short prioritization, and a dealer prioritization.

6. The system of claim 1, wherein the computer system is further programmed to determine, based on a user input, which deals to prioritize in collateralization, based on a weighting of margins and cost of carry.

7. The system of claim 1, wherein the computer system is further programmed to process at least some of the collateral or the one or more records in parallel across one or more message passing nodes.

8. The system of claim 7, wherein the computer system is further programmed to:
match, via the message passing nodes, collateral to the one or more records via vertex degrees in a bipartite graph created between a set of positions in the collateral and a set of the one or more records.

9. The system of claim 1, further comprising a user interface is operatively coupled to the computer system via a network connection.

10. The system of claim 9, wherein the user interface comprises an Internet web portal.

11. The system of claim 1, wherein the computer system comprises a plurality of message passing nodes, and wherein the computer system is further programmed to synchronize at least a portion of the collateral characteristics among the plurality of message passing nodes to prevent different ones of the plurality of message passing nodes from simultaneously replacing the portion of the collateral.

12. A computer-implemented method for optimizing data processing in machine learning environments through using self organizing maps, the method being implemented in a computer system having one or more physical processors programmed with computer instructions that, when executed by the one or more physical processors, cause the computer system to perform the method, the method comprising:
accessing one or more cloud-based memory elements coupled to the computer system and configured to at least store deal attributes including collateral allocation rulesets associated with a first device, and collateral characteristics for collateral provided by a second device that are associated with one or more records;
retrieving a machine learning model implemented on the computer system that is trained based on portfolio deal attributes including collateral allocation rulesets associated with a training portfolio to produce a self organizing map, wherein:
the machine learning model is trained, by generating outputs based on inputs of the training portfolio and updating configurations of the machine learning model based on assessments of predictions in the outputs, to generate a self organizing map for collateral allocation; and
the self organizing map comprises a neural network that uses vectors of margins for individual positions as inputs to train the neural network in a learning mode, wherein the learning mode comprises use of competitive learning by the neural network in which nodes of the neural network compete for a right to respond to a subset of the inputs such that the nodes learn to specialize on ensembles of similar patterns and are configured as feature detectors for different classes of input patterns, and wherein the neural network classifies a new input vector using a mapping mode, wherein the mapping mode comprises use of a Euclidian Distance formula to group recalled collateral based on the margins for individual positions:

recalling, via the computer system, collateral originally associated with the one or more records into a common dealer box; and identifying, via the computer system, under-collateralized ones of the one or more records.

13. The method of claim 12, further comprising:

identifying, via the computer system, using the self organizing map and one or more of the collateral allocation rulesets and the collateral characteristics, groups of recalled collateral; and sorting, via the computer system, said groups of collateral such that smaller average margins are given a higher priority while larger average margins are given a lower priority.

14. The method of claim 13, further comprising:

determining, via the computer system, messaging passing nodes available for performing collateral allocation for the one or more records; and assigning, via the computer system, the groups of recalled collateral from the common dealer box to a message passing nodes such that one of the message passing nodes is assigned to each of the one or more records in order from the higher priority to the lower priority to allocate collateral to the one or more records.

15. The method of claim 14, further comprising:

providing, via the computer system, the collateral allocation rulesets to the message passing nodes to cause each of the message passing nodes to allocate collateral to its respective records in accordance with the collateral allocation rulesets, performances of collateral allocations by each of the message passing nodes comprising the message passing node performing collateral allocation with respect to the message passing node's records.

16. The method of claim 12, wherein the determining further comprising weighing a priority ranking for a basket schedule, a market deadline, an internal short prioritization, and a dealer prioritization.

17. The method of claim 12, further comprising determining, via the computer system, based on a user input, which deals to prioritize in collateralization, based on a weighting of margins and cost of carry.

18. The method of claim 12, wherein at least some of the collateral and/or the one or more records are processed in parallel across the one or more message passing nodes.

19. The method of claim 18, wherein said assigning comprises matching, via the message passing nodes, collateral to the one or more records via vertex degrees in a bipartite graph, created between a set of positions in the collateral and a set of the one or more records.

20. The method of claim 12, wherein the computer system comprises a plurality of message passing nodes, and wherein the computer system is further programmed to synchronize at least a portion of the collateral characteristics among the plurality of message passing nodes to prevent different ones of the plurality of message passing nodes from simultaneously replacing the portion of the collateral.

\* \* \* \* \*